(12) United States Patent
Matono et al.

(10) Patent No.: US 7,391,590 B2
(45) Date of Patent: Jun. 24, 2008

(54) THIN FILM MAGNETIC HEAD AND MAGNETIC RECORDING APPARATUS WITH PARTITIONED HEAT SINK LAYER

(75) Inventors: Naoto Matono, Saku (JP); Norikazu Ota, Chuo-ku (JP); Mitsuo Otsuki, Chuo-ku (JP)

(73) Assignee: TDK Corporation, Tokyo (JP)

( * ) Notice: Subject to any disclaimer, the term of this patent is extended or adjusted under 35 U.S.C. 154(b) by 359 days.

(21) Appl. No.: 10/926,986

(22) Filed: Aug. 27, 2004

(65) Prior Publication Data

US 2005/0047015 A1      Mar. 3, 2005

(30) Foreign Application Priority Data

Aug. 29, 2003      (JP)      .............. 2003-307377

(51) Int. Cl.
*G11B 5/40*      (2006.01)
*G11B 5/127*      (2006.01)

(52) U.S. Cl. ................................. 360/125.32
(58) Field of Classification Search ............ 360/125.32, 360/125.75, 125, 126
See application file for complete search history.

(56) References Cited

U.S. PATENT DOCUMENTS

| | | | | |
|---|---|---|---|---|
| 6,731,461 B2* | 5/2004 | Yamada et al. | ............... | 360/126 |
| 6,859,343 B1* | 2/2005 | Alfoqaha et al. | ............ | 360/126 |
| 6,950,280 B2* | 9/2005 | Rea et al. | ............... | 360/125.31 |
| 7,082,016 B2* | 7/2006 | Pust et al. | ................... | 360/319 |
| 2005/0190495 A1* | 9/2005 | Lille | ........................... | 360/128 |
| 2005/0219749 A1* | 10/2005 | Aoki et al. | .................. | 360/126 |

FOREIGN PATENT DOCUMENTS

| | | |
|---|---|---|
| JP | A-04-221410 | 8/1992 |
| JP | A-2001-236614 | 8/2000 |
| JP | A-2002-100005 | 4/2002 |
| JP | A 2003-085707 | 3/2003 |
| JP | A-2004-362661 | 12/2004 |

OTHER PUBLICATIONS

Japanese Office Action for 2003-307377, Feb. 18, 2008.*

* cited by examiner

*Primary Examiner*—Julie Anne Watko
(74) *Attorney, Agent, or Firm*—Oliff & Berridge, PLC

(57) ABSTRACT

Provided is a thin film magnetic head capable of reducing the amount of protrusion of a write shield layer, thereby preventing a collision with a recording medium, and thereby ensuring a recording operation with stability. A heat sink layer is disposed on the leading side of a thin film coil in order to dissipate heat produced by the thin film coil. When the thin film coil produces heat during the recording of information, priority is given to the guidance of the heat to the leading side of the thin film coil, namely, the side opposite to the position of the write shield layer, rather than the guidance of the heat to the trailing side of the thin film coil, namely, the position of the write shield layer, so as to dissipate the heat. Thus, the thin film magnetic head reduces the likelihood of the heat accumulating in the write shield layer, thus reduces the likelihood of the write shield layer expanding thermally, and thus reduces the amount of protrusion of the write shield layer.

15 Claims, 22 Drawing Sheets

THIN FILM MAGNETIC HEAD AND MAGNETIC RECORDING APPARATUS WITH PARTITIONED HEAT SINK LAYER

BACKGROUND OF THE INVENTION

1. Field of the Invention

The invention relates to a thin film magnetic head including an inductive magnetic transducer for use in at least recording, and a magnetic recording apparatus equipped with a thin film magnetic head.

2. Description of the Related Art

Recently, an improvement in performance of a thin film magnetic head mounted on a magnetic recording apparatus (e.g., a hard disk drive) has been sought in accordance with an increase in a surface recording density of a magnetic recording medium (e.g., a hard disk). A longitudinal recording type and a perpendicular recording type, for example, are known as the recording types of the thin film magnetic head. The longitudinal recording type is designed to orient a signal magnetic field in the in-plane direction of the hard disk (i.e., the longitudinal direction thereof). The perpendicular recording type is designed to orient a signal magnetic field in a direction perpendicular to the surface of the hard disk. Although the longitudinal recording type is widely used at present, the perpendicular recording type rather than the longitudinal recording type can be regarded as promising in the future, taking into account market trends incident to an increase in the surface recording density of the hard disk. The reason is as follows. The perpendicular recording type can obtain the advantage that the hard disk having information recorded thereon is less susceptible to thermal fluctuations, as well as the advantage of being capable of ensuring a high linear recording density.

The thin film magnetic head of the perpendicular recording type includes a thin film coil which generates a magnetic flux; a magnetic pole layer which emits to the hard disk the magnetic flux generated by the thin film coil, the magnetic pole layer being located on the leading side of the thin film coil and extending rearward from an air bearing surface; and a write shield layer which prevents divergence of the magnetic flux emitted from the magnetic pole layer, the write shield layer being located on the trailing side of the thin film coil and extending rearward from the air bearing surface. This thin film magnetic head performs a recording operation in the following manner. A current is fed through the thin film coil so that the thin film coil generates a magnetic flux for recording. Then, the magnetic pole layer emits the magnetic flux to the hard disk. The magnetic flux generates a magnetic field for recording (i.e., a perpendicular magnetic field), and the recording magnetic field magnetizes the hard disk. In this manner, the thin film magnetic head magnetically records information on the hard disk. During the recording operation, the write shield layer takes in a divergent component of the magnetic flux emitted from the magnetic pole layer, thus preventing divergence of the magnetic flux, that is, an increase in a write width.

During the recording operation of the thin film magnetic head, a current is fed through the thin film coil in order that the thin film coil generates a magnetic flux, as mentioned above. Thus, the thin film coil produces heat, which is consequently prone to accumulate in and near the thin film coil in the thin film magnetic head. In this case, too large an amount of heat accumulating in the write shield layer causes thermal expansion of the write shield layer under the influence of thermal energy, thus causes considerable protrusion of the write shield layer beyond the air bearing surface, thus causes a collision of the write shield layer with the rotating hard disk, thus causes damage to the thin film magnetic head, and thus leads to an increase in the likelihood of the hard disk drive breaking down. From this viewpoint, the thin film magnetic head has to minimize the amount of heat accumulating in and near the write shield layer in order to reduce the amount of protrusion of the write shield layer for the purpose of ensuring the recording operation of the thin film magnetic head with stability and also preventing the occurrence of a breakdown of the hard disk drive.

However, it cannot be said that conventional thin film magnetic heads provide satisfactory solutions to heat accumulation in the write shield layer. Thus, considerable protrusion of the write shield layer can occur and cause damage to the thin film magnetic head, depending on conditions such as the amount of heat produced by the thin film coil or the coefficient of thermal expansion of the write shield layer. Therefore, the conventional thin film magnetic heads may still cause a breakdown of the hard disk drive. More recently, the amount of levitation of a head slider having the thin film magnetic head mounted thereto, namely, the distance between the air bearing surface of the thin film magnetic head and a recording surface of the hard disk, has been reduced to about 10 nm. Accordingly, the thin film magnetic head must minimize the amount of protrusion of the write shield layer in order to prevent the thin film magnetic head from colliding with the hard disk.

For example, techniques for reducing the amount of heat accumulating in the thin film magnetic head include the approach of utilizing a thermally conductive heat sink layer to dissipate heat and thereby prevent heat from accumulating in the thin film magnetic head. For example, a magnetic head including a thin film coil, a magnetic pole layer, and a heat sink layer, wherein the heat sink layer is disposed on the trailing side of the thin film coil, more specifically beside or over the magnetic pole layer is specifically known as a thin film magnetic head which the above-mentioned approach is applied to (e.g., see Japanese Unexamined Patent Application Publication No. 2003-085707). However, this type of thin film magnetic head still has room for improvement in prevention of a collision of the thin film magnetic head, taking into account the recent trend, specifically that the amount of levitation of the head slider is decreasing year by year as mentioned above.

SUMMARY OF THE INVENTION

The invention is designed to overcome the foregoing problems. It is a first object of the invention to provide a thin film magnetic head which is capable of reducing the amount of protrusion of a write shield layer, thereby preventing a collision with a recording medium, and thereby ensuring a recording operation with stability.

It is a second object of the invention to provide a magnetic recording apparatus equipped with a thin film magnetic head of the invention, which is capable of preventing the occurrence of a breakdown resulting from a collision of the thin film magnetic head with a recording medium.

A thin film magnetic head of the invention, which performs magnetic processing on a recording medium which moves in a medium travel direction, includes a thin film coil which generates a magnetic flux; a magnetic pole layer which emits the magnetic flux generated by the thin film coil to the recording medium, the magnetic pole layer being located on the side, of the thin film coil, opposite to the medium travel direction, the magnetic pole layer extending rearward from a recording-medium-facing surface to be faced with the recording medium; a write shield layer which prevents divergence of the magnetic flux emitted from the magnetic pole layer, the write shield layer being located on the medium-travel-direction side of the thin film coil and extending rearward from the recording-medium-facing surface; and a heat sink layer which dissipates heat produced by the thin film coil, the heat sink layer being located on the side, of the thin film coil, opposite to the medium travel direction.

When the thin film coil produces heat, the thin film magnetic head of the invention guides the heat to the heat sink layer located on the side, of the thin film coil, opposite to the medium travel direction, so as to dissipate the heat. Thus, priority is given to the guidance of the heat to the side, of the thin film coil, opposite to the medium travel direction. As a result, the thin film magnetic head of the invention reduces the likelihood of the heat accumulating in the write shield layer located on the medium-travel-direction side of the thin film coil, and thus reduces the likelihood of the write shield layer expanding thermally.

A magnetic recording apparatus of the invention includes a recording medium which moves in a medium travel direction, and a thin film magnetic head which performs magnetic processing on the recording medium, the thin film magnetic head including a thin film coil which generates a magnetic flux; a magnetic pole layer which emits the magnetic flux generated by the thin film coil to the recording medium, the magnetic pole layer being located on the side, of the thin film coil, opposite to the medium travel direction, the magnetic pole layer extending rearward from a recording-medium-facing surface to be faced with the recording medium; a write shield layer which prevents divergence of the magnetic flux emitted from the magnetic pole layer, the write shield layer being located on the medium-travel-direction side of the thin film coil and extending rearward from the recording-medium-facing surface; and a heat sink layer which dissipates heat produced by the thin film coil, the heat sink layer being located on the side, of the thin film coil, opposite to the medium travel direction.

The magnetic recording apparatus of the invention includes the above-described thin film magnetic head of the invention. Thus, the magnetic recording apparatus reduces the likelihood of the write shield layer expanding thermally in the thin film magnetic head.

The thin film magnetic head of the invention reduces the likelihood of thermal expansion of the write shield layer located on the medium-travel-direction side of the thin film coil and thus reduces the likelihood of the write shield layer projecting beyond the recording-medium-facing surface, by reason of the structural feature that the heat sink layer is located on the side, of the thin film coil, opposite to the medium travel direction. Therefore, the thin film magnetic head of the invention can reduce the amount of protrusion of the write shield layer, thereby prevent a collision with the recording medium, and thereby ensure the recording operation with stability.

The magnetic recording apparatus of the invention includes the thin film magnetic head of the invention. Thus, the magnetic recording apparatus reduces the likelihood of a collision of the thin film magnetic head with the recording medium due to the protrusion of the write shield layer. Therefore, the magnetic recording apparatus can prevent the occurrence of a breakdown resulting from a collision of the thin film magnetic head with the recording medium.

Other and further objects, features and advantages of the invention will appear more fully from the following description.

DETAILED DESCRIPTION OF THE PREFERRED EMBODIMENTS

Embodiments of the invention will be described in detail below with reference to the drawings.

First Embodiment

Figure 1:
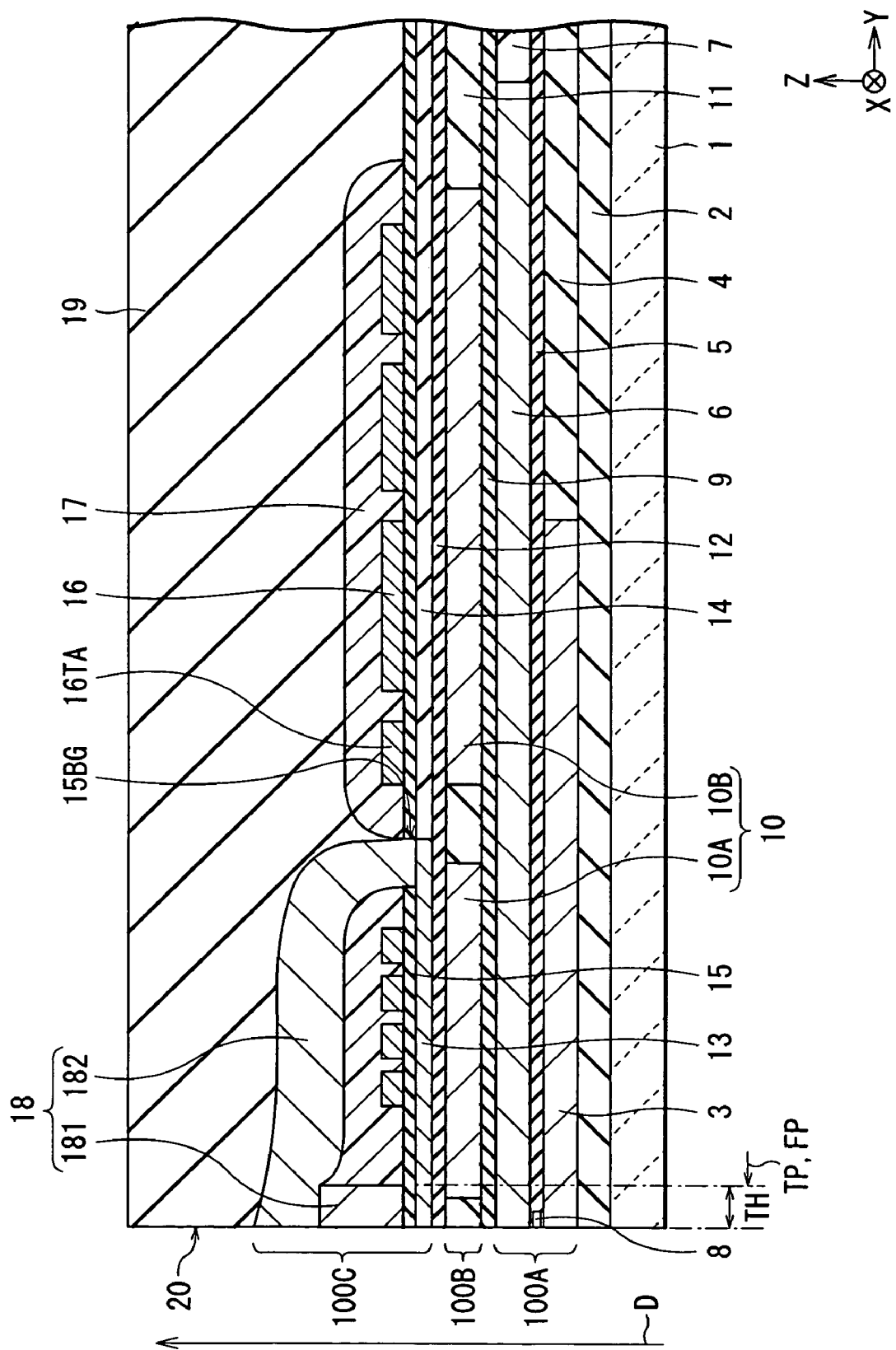
FIG. 1 is a cross-sectional view showing a cross-sectional configuration (i.e., the cross-sectional configuration perpendicular to an air bearing surface) of a thin film magnetic head according to a first embodiment of the invention.
Figure 2:
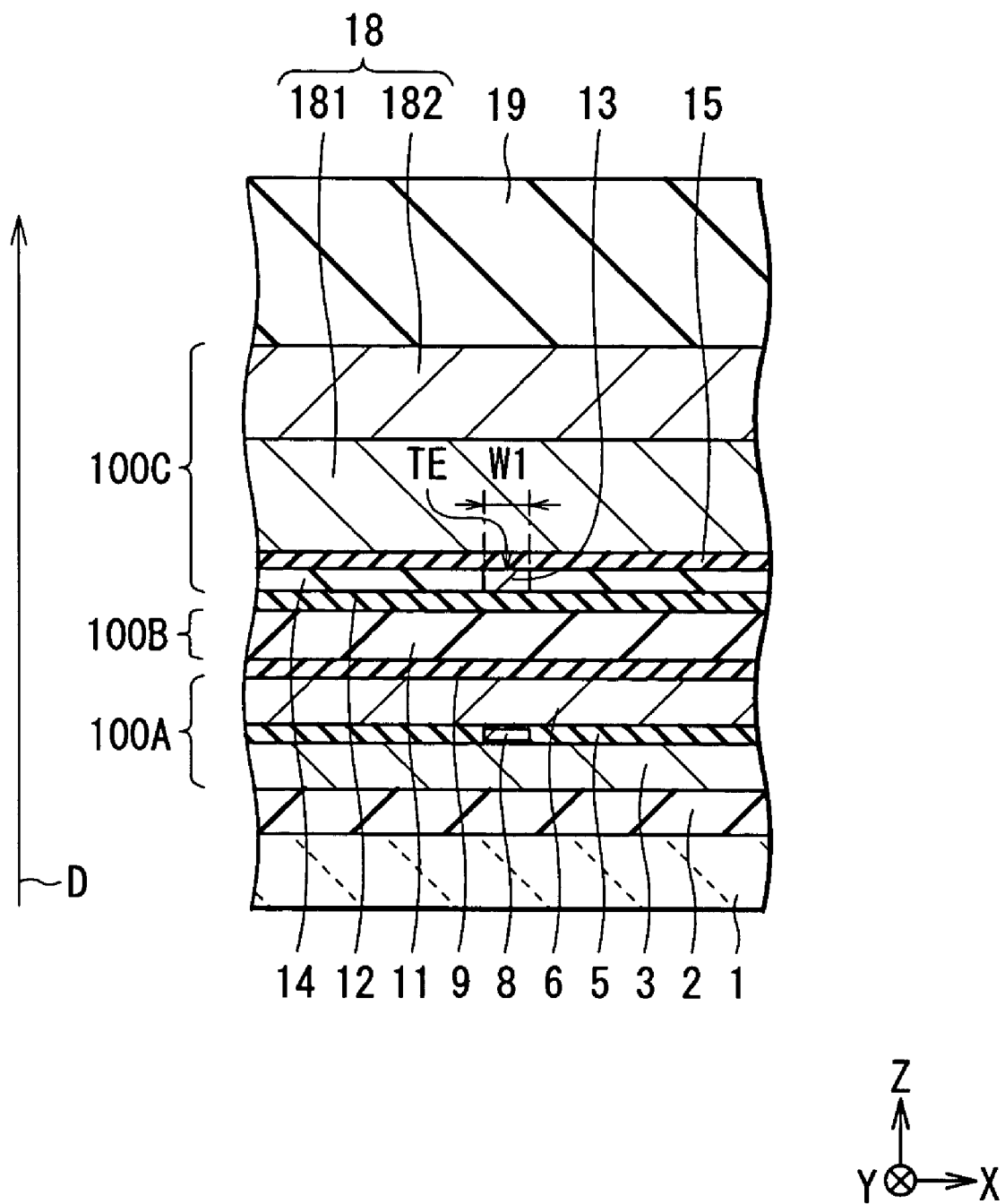
FIG. 2 is a cross-sectional view showing another cross-sectional configuration (i.e., the cross-sectional configuration parallel to the air bearing surface) of the thin film magnetic head according to the first embodiment of the invention.
Figure 3:
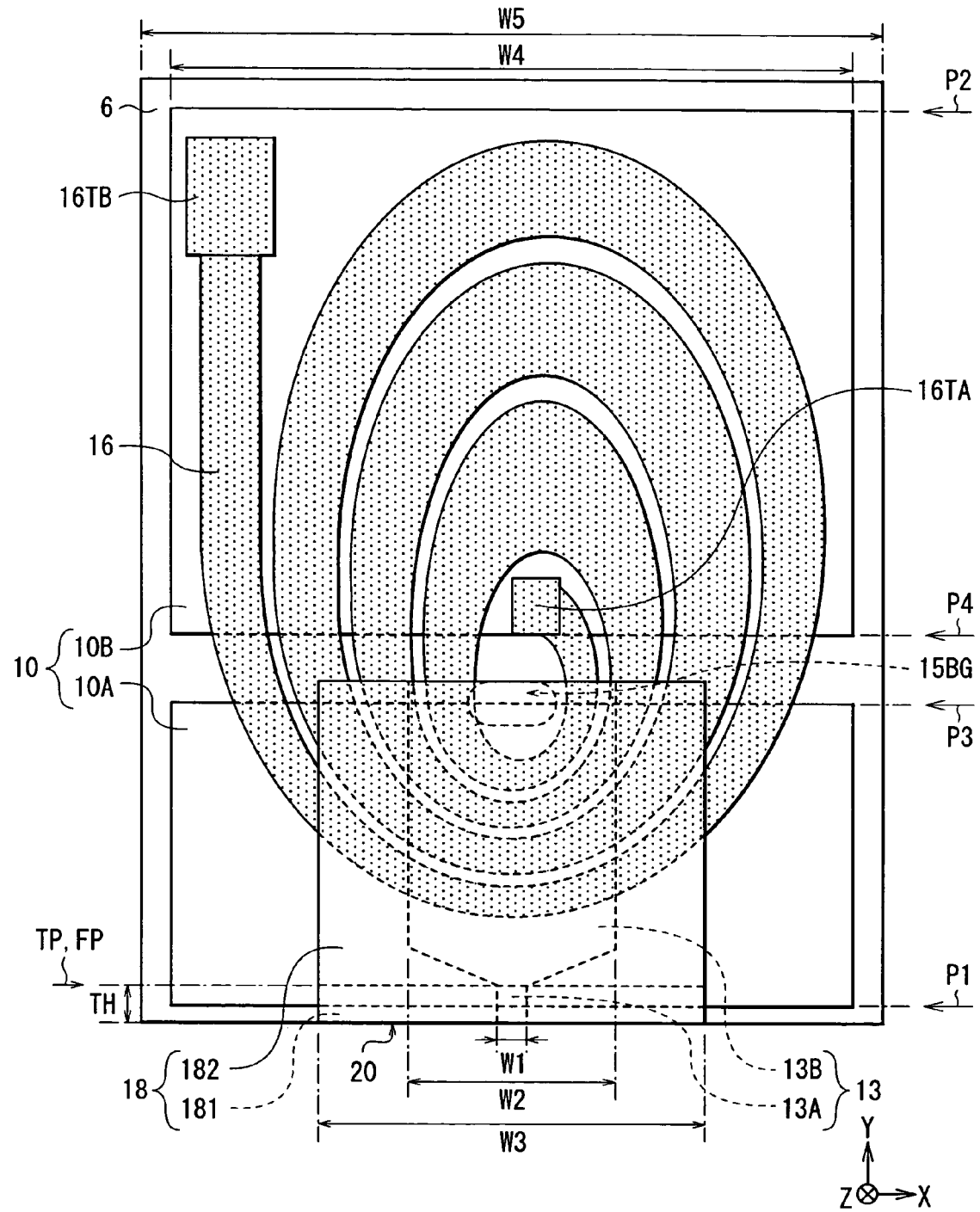
FIG. 3 is a plan view showing the plan configuration of a principal part of the thin film magnetic head shown in FIGS. 1 and 2.

Firstly, the description is given with reference to FIGS. 1 to 3 with regard to the configuration of a thin film magnetic head according to a first embodiment of the invention. FIGS. 1 and 2 show the cross-sectional configuration of the thin film magnetic head, and FIGS. 1 and 2 show a cross section perpendicular to an air bearing surface (i.e., a cross section along the Y-Z plane) and a cross section parallel to the air bearing surface (i.e., a cross section along the X-Z plane), respectively. FIG. 3 shows the plan configuration of a principal part of the thin film magnetic head shown in FIGS. 1 and 2. Incidentally, the upward-pointing arrow D shown in FIGS. 1 and 2 indicates a direction in which a magnetic recording medium (not shown) travels relative to the thin film magnetic head (i.e., a medium travel direction).

Hereinafter, dimensions along the X, Y and Z axes shown in FIGS. 1 to 3 are defined as a "width", a "length", and a "thickness", respectively. The side close to the air bearing surface, as viewed along the Y axis, is defined as the "frontward" side, and the opposite side is defined as the "rearward" side. The same definitions are applied to FIG. 4 and the following drawings as will appear later.

For example, the thin film magnetic head is to be mounted on a magnetic recording apparatus such as a hard disk drive in order to perform magnetic processing on a magnetic recording medium (hereinafter referred to simply as a "recording medium"), such as a hard disk, which travels in the medium travel direction D. Specifically, the thin film magnetic head is a combined head capable of performing both recording and reproducing as the magnetic processing. As shown in FIG. 1, the thin film magnetic head has a stacked structure comprising an insulating layer 2 made of a nonmagnetic insulating material such as aluminum oxide ($Al_2O_3$) (hereinafter referred to simply as "alumina"), a reproducing head part 100A which performs reproducing utilizing a magnetoresistive (MR) effect, an isolating layer 9 (or a second isolating layer) made of a nonmagnetic insulating material such as alumina, a heat sink part 100B including a heat sink layer 10 for dissipating heat, an isolating layer 12 (or a first isolating layer) made of a nonmagnetic insulating material such as alumina, a recording head part 100C of single magnetic pole type which performs perpendicular recording, and an overcoat layer 19 made of a nonmagnetic insulating material such as alumina, which are stacked in this sequence on a substrate 1 made of a ceramic material such as $Al_2O_3$—TiC fine ceramics.

For example, the reproducing head part 100A has a stacked structure comprising a bottom read shield layer 3 which an insulating layer 4 fills in around, a shield gap film 5, and a top read shield layer 6 (or a read shield layer) which an insulating layer 7 fills in around, which are stacked in this sequence. An MR element 8 (i.e., a magnetoresistive effect element), which acts as a reproducing device, is embedded in the shield gap film 5 in such a manner that one end surface of the MR element 8 is exposed on a recording-medium-facing surface (i.e., an air bearing surface) 20 to be faced with the recording medium.

Both the bottom and top read shield layers 3 and 6 serve to magnetically isolate the MR element 8 from its surroundings, and the layers 3 and 6 extend rearward from the air bearing surface 20. Both the bottom and top read shield layers 3 and 6 are made of a magnetic material such as a nickel-iron alloy (NiFe (containing 80 wt % Ni and 20 wt % Fe, for example)) (hereinafter referred to simply as "Permalloy" (its trade name)), and the layers 3 and 6 each have a thickness of about 1.0 to 2.0 μm. The top read shield layer 6 is disposed between the MR element 8 of the reproducing head part 100A and the heat sink layer 10 of the heat sink part 100B.

The shield gap film 5 serves to electrically isolate the MR element 8 from its surroundings, and the shield gap film 5 is made of a nonmagnetic insulating material such as alumina.

The MR element 8 serves to perform magnetic processing (that is, reproducing) utilizing a magnetoresistive effect such as a giant magnetoresistive (GMR) effect or a tunneling magnetoresistive (TMR) effect. The MR element 8 is disposed on the leading side of the heat sink layer 10 of the heat sink part 100B. Provided that the travel of the recording medium in the medium travel direction D shown in FIGS. 1 and 2 is regarded as a stream, the "leading side", as employed herein, refers to the side into which the stream flows (namely, the side opposite to the medium travel direction D). In FIGS. 1 and 2, the leading side corresponds to the downward side as viewed along the thickness (that is, along the Z axis). On the other hand, the side out of which the stream flows (namely, the side that is the same as the medium travel direction D) is called the "trailing side". In FIGS. 1 and 2, the trailing side corresponds to the upward side as viewed along the thickness.

For example, the heat sink part 100B has a structure comprising the above-mentioned heat sink layer 10 and an isolating layer 11 (or a third isolating layer) which fills in around the heat sink layer 10. The isolating layer 11 is made of a nonmagnetic insulating material such as alumina, and the heat sink layer 10 is magnetically isolated from its surroundings with the isolating layer 11 in between. The description will be given later with regard to details about the configuration and others of the heat sink layer 10.

For example, the recording head part 100C has a stacked structure comprising a magnetic pole layer 13 which an insulating layer 14 fills in around, a gap layer 15 having an opening for magnetic coupling (i.e., a back gap 15BG) formed therein, a thin film coil 16 buried in an insulating layer 17, and a write shield layer 18 (or a write shield layer), which are stacked in this sequence. In FIG. 3, there are shown some structural components of the thin film magnetic head shown in FIGS. 1 and 2, specifically the top read shield layer 6 of the reproducing head part 100A, the heat sink layer 10 of the heat sink part 100B, and the magnetic pole layer 13, the thin film coil 16 and the write shield layer 18 of the recording head part 100C.

The magnetic pole layer 13 serves to contain a magnetic flux generated by the thin film coil 16 and emit the magnetic flux to the recording medium. The magnetic pole layer 13 is made of a plated film such as Permalloy or an alloy containing iron and cobalt. For example, the above-mentioned "alloys containing iron and cobalt" include an iron-cobalt alloy (FeCo) and an iron-cobalt-nickel alloy (FeCoNi). The magnetic pole layer 13 is located on the leading side of the thin film coil 16 and extends rearward from the air bearing surface 20. More specifically, the magnetic pole layer 13 extends to the position corresponding to the back gap 15BG formed in the gap layer 15. For example, as shown in FIG. 3, the magnetic pole layer 13 extends rearward from the air bearing surface 20 and includes a front end portion 13A and a rear end portion 13B. The front end portion 13A has a uniform width W1 (of about 0.15 µm) which defines a write track width of the recording medium. The rear end portion 13B is magnetically coupled to a rearward part of the front end portion 13A and has a width W2 greater than the width W1 of the front end portion 13A (W2>W1). The point at which the width of the magnetic pole layer 13 increases from the width W1 of the front end portion 13A to the width W2 of the rear end portion 13B is a "flare point FP" which is one important determinant factor of the recording performance of the thin film magnetic head. The insulating layer 14 serves to electrically isolate the magnetic pole layer 13 from its surroundings, and the insulating layer 14 is made of a nonmagnetic insulating material such as alumina.

The gap layer 15 constitutes a gap to provide magnetic isolation between the magnetic pole layer 13 and the write shield layer 18. The gap layer 15 is made of a nonmagnetic insulating material such as alumina and has a thickness of about 0.2 µm or less.

The thin film coil 16 serves to generate a magnetic flux for recording, and the coil 16 is made of a conductive material such as copper (Cu). For example, as shown in FIG. 3, the thin film coil 16 is spirally wound around one end thereof near the back gap 15BG, and the width of winding and the pitch of windings are small in a frontward part of the thin film coil 16 and are great in a rearward part of the thin film coil 16. The thin film coil 16 has terminals 16TA and 16TB, which are disposed on one and the other ends of the coil 16, namely, the inner and outer ends thereof, respectively. In FIGS. 1 and 3, there are shown some of a plurality of windings constituting the thin film coil 16.

The insulating layer 17 serves to cover the thin film coil 16 and thereby electrically isolate the thin film coil 16 from its surroundings, and the insulating layer 17 is formed on the gap layer 15 so as not to fill in the back gap 15BG. The insulating layer 17 is made of a material to which heating imparts fluidity, such as a photoresist (or a photosensitive resin) or spin on glass (SOG), and the insulating layer 17 has a rounded slope on and near its edge. The position of the forefront end of the insulating layer 17 is a "throat height zero position TP" which is one important determinant factor of the recording performance of the thin film magnetic head. The distance between the throat height zero position TP and the air bearing surface 20 is a "throat height TH", which is about 0.3 µm or less. In FIGS. 1 and 3, for example, the throat height zero position TP coincides with the flare point FP.

The write shield layer 18 serves to take in a divergent component of a magnetic flux emitted from the magnetic pole layer 13 and thereby prevent the magnetic flux from diverging. The write shield layer 18 is located on the trailing side of the thin film coil 16 and extends rearward from the air bearing surface 20. More specifically, the write shield layer 18 extends in such a manner that the write shield layer 18 is separated from the magnetic pole layer 13 by the gap layer 15 on the side close to the air bearing surface 20 and is adjacent and magnetically coupled to the magnetic pole layer 13 through the back gap 15BG on the side far away from the air bearing surface 20. For example, the write shield layer 18 includes two separate structural components, that is, a TH defining layer 181 which functions as a main magnetic flux intake, and a yoke layer 182 which functions as a flow path of a magnetic flux taken in through the TH defining layer 181.

The TH defining layer 181 is adjacent to the gap layer 15 and extends from the air bearing surface 20 to a position between the air bearing surface 20 and the back gap 15BG, more specifically a position between the air bearing surface 20 and the thin film coil 16. The TH defining layer 181 is made of a magnetic material such as Permalloy or an alloy containing iron and cobalt. For example, as shown in FIG. 3, the TH defining layer 181 has a rectangular shape in plan configuration, having a width W3 greater than the width W2 of the magnetic pole layer 13 (W3>W2). The TH defining layer 181 is adjacent to the insulating layer 17 in which the thin film coil 16 is buried. Specifically, the TH defining layer 181 serves to define the position of the most front end of the insulating layer 17 (i.e., the throat height zero position TP), more specifically the throat height TH.

The yoke layer 182 extends from the air bearing surface 20 to the position corresponding to the back gap 15BG so as to cover the insulating layer 17. A frontward part of the yoke layer 182 overlies and is magnetically coupled to the TH defining layer 181, and a rearward part of the yoke layer 182 is adjacent and magnetically coupled to the magnetic pole layer 13 through the back gap 15BG. The yoke layer 182 is made of, for example, the same magnetic material as the TH defining layer 181. The yoke layer 182 has a rectangular shape having the width W3 in plan configuration as shown in FIG. 3, as in the case of the TH defining layer 181.

Next, the detailed description is given with regard to the heat sink part 100B, which is a characteristic part of the thin film magnetic head according to the first embodiment.

The heat sink layer 10 which is a principal part of the heat sink part 100B serves to dissipate heat produced by the thin film coil 16 of the recording head part 100C, and the heat sink layer 10 is disposed on the leading side of the thin film coil 16, more specifically the leading side of the magnetic pole layer 13. The heat sink layer 10 is made of, for example, a nonmagnetic material, preferably a material having higher thermal conductivity and a lower coefficient of thermal expansion than the write shield layer 18, or more preferably a material having higher thermal conductivity and a lower coefficient of thermal expansion than the magnetic pole layer 13. Specifically, the heat sink layer 10 contains a material selected from the group consisting of, for example, copper (Cu), gold (Au), silver (Ag), platinum (Pt), palladium (Pd), chromium (Cr), zinc (Zn), tin (Sn), and tungsten (W). As an example, the heat sink layer 10 is made of copper having superior thermal conductivity in the above-mentioned group of materials. For example, the heat sink layer 10 is electrically isolated from the top read shield layer 6 with the isolating layer 9, which is disposed between the heat sink layer 10 and the read shield layer 6, in between. Moreover, the heat sink layer 10 is electrically isolated from the magnetic pole layer 13 with the isolating layer 12, which is disposed between the heat sink layer 10 and the magnetic pole layer 13, in between.

For example, as shown in FIG. 3, the heat sink layer 10 is disposed in a region corresponding to a region in which the thin film coil 16 is disposed. The contour of the plan configuration of the heat sink layer 10 is larger than the contour of the plan configuration of the thin film coil 16. The description "the contour of the heat sink layer 10 is larger than the contour of the thin film coil 16" means that the heat sink layer 10 is disposed so as to include the region in which the thin film coil 16 is disposed, and so as to extend over a wider area than the region in which the thin film coil 16 is disposed. For example, the heat sink layer 10 is not exposed on the air bearing surface 20 and extends from a rearward position relative to the air bearing surface 20 (i.e., a starting point P1) to a rearward position (i.e., an endpoint P2). The heat sink layer 10 has a partitioned structure in which the heat sink layer 10 is partitioned into a plurality of portions in a direction in which the heat sink layer 10 extends. Thus, the heat sink layer 10 extends discontinuously. Specifically, the heat sink layer 10 includes, for example, two separate structural components, that is, a frontward portion 10A (or a first heat sink layer portion) and a rearward portion 10B (or a second heat sink layer portion). The frontward portion 10A extends from the starting point P1 to a point between the starting point P1 and the endpoint P2 (i.e., a midpoint P3 or a first midpoint). The rearward portion 10B extends from a rearward position relative to the midpoint P3 (i.e., a midpoint P4 or a second midpoint) to the endpoint P2, and the rearward portion 10B is isolated from the frontward portion 10A. For example, the frontward and rearward portions 10A and 10B each have a rectangular shape in plan configuration, having a width W4 greater than the width W3 (W4>W3). The distance between the frontward and rearward portions 10A and 10B can be freely set. The top read shield layer 6 of the reproducing head part 100A is disposed in a region corresponding to the region in which the heat sink layer 10 is disposed, according to the region in which the heat sink layer 10 is disposed. The contour of the plan configuration of the top read shield layer 6 is larger than the contour of the plan configuration of the heat sink layer 10. For example, the top read shield layer 6 has a rectangular shape in plan configuration, having a width W5 greater than the width W4 (W5>W4). The description "the contour of the top read shield layer 6 is larger than the contour of the heat sink layer 10" means that the top read shield layer 6 is disposed so as to include the region in which the heat sink layer 10 is disposed, and so as to extend over a wider area than the region in which the heat sink layer 10 is disposed. For instance, it is not necessarily required that the frontward and rearward portions 10A and 10B constituting the heat sink layer 10 be made of the same material. The material of the frontward portion 10A may be different from that of the rearward portion 10B. When the material of the frontward portion 10A is different from that of the rearward portion 10B, it is preferable that, for example, the frontward portion 10A be made of a material having a lower coefficient of thermal expansion, and that the rearward portion 10B be made of a material having higher thermal conductivity. Incidentally, when the heat sink layer 10 includes the frontward portion 10A and the rearward portion 10B as mentioned above, the isolating layer 11 fills in not only around the heat sink layer 10 but also between the frontward and rearward portions 10A and 10B.

Next, the description is given with reference to FIGS. 1 to 3 with regard to the operation of the thin film magnetic head.

When recording information, the thin film magnetic head operates in the following manner. An external circuit (not shown) feeds a current through the thin film coil 16 of the recording head part 100C via the terminals 16TA and 16TB so that the thin film coil 16 generates a magnetic flux. The generated magnetic flux is contained in the magnetic pole layer 13 and then flows through the magnetic pole layer 13 from the rear end portion 13B to the front end portion 13A. When flowing through the magnetic pole layer 13, the magnetic flux is narrowed and focused at the flare point FP as the width of the magnetic pole layer 13 decreases. Thus, the magnetic flux converges on and near a trailing edge TE of the front end portion 13A (see FIG. 2). Then, the magnetic flux converging on and near the trailing edge TE is emitted outward from the front end portion 13A. The magnetic flux generates a recording magnetic field in a direction perpendicular to the surface of the recording medium, and the recording magnetic field perpendicularly magnetizes the recording medium. In this manner, the thin film magnetic head magnetically records information on the recording medium. During the recording of information, the write shield layer 18 takes in a divergent component of the magnetic flux emitted from the front end portion 13A, thus preventing the magnetic flux from diverging. The magnetic flux taken in by the write shield layer 18 is returned to the magnetic pole layer 13 via the back gap 15BG.

When reproducing information, the thin film magnetic head operates in the following manner. A sense current is fed through the MR element 8 of the reproducing head part 100A so that the resistance value of the MR element 8 changes according to a signal magnetic field for reproducing from the recording medium. Then, the resistance change is detected as a change in the sense current. In this manner, the thin film magnetic head magnetically reads out information recorded on the recording medium.

During the recording of information, the thin film magnetic head also operates in the following manner. When the passage of a current through the thin film coil 16 causes the thin film coil 16 to produce heat, priority is given to the guidance of the produced heat to the heat sink layer 10 (i.e., the frontward portion 10A and the rearward portion 10B), which is disposed on the leading side of the thin film coil 16. The heat guided to the heat sink layer 10 is further guided to the substrate 1 via the top read shield layer 6, the bottom read shield layer 3, and the insulating layer 2, and thus the guided heat is dissipated.

Next, the description is given with reference to FIGS. 1 to 8 with regard to a method of manufacturing the thin film magnetic head shown in FIGS. 1 to 3. FIGS. 4 to 8 are of assistance in explaining the steps of manufacturing the thin film magnetic head, and FIGS. 4 to 8 show a cross-sectional configuration corresponding to FIG. 1.

Hereinafter, the brief description is first given with reference to FIG. 1 with regard to the steps of manufacturing the overall thin film magnetic head, and then the detailed description is given with reference to FIGS. 1 to 8 with regard to the steps of forming the principal part (that is, the heat sink part 100B and the recording head part 100C) of the thin film magnetic head. Appropriately omitted is the description of matters previously described in detail, such as the materials, dimensions and structural features of the structural components of the thin film magnetic head.

The thin film magnetic head is manufactured by forming and stacking the structural components in sequence using existing thin film processes, mainly including deposition technique such as plating or sputtering, patterning technique such as photolithographic technique, and etching technique such as dry etching. Specifically, the thin film magnetic head is manufactured as shown in FIG. 1. First, the insulating layer 2 is formed on the substrate 1. Then, the reproducing head part 100A is formed on the insulating layer 2. Specifically, the bottom read shield layer 3 which the insulating layer 4 fills in around, the shield gap film 5 having the MR element 8 embedded therein, and the top read shield layer 6 which the insulating layer 7 fills in around are stacked in this sequence on the insulating layer 2. Then, the isolating layer 9 is formed on the reproducing head part 100A. Then, the heat sink part 100B is formed on the isolating layer 9. Specifically, the heat sink layer 10 which the isolating layer 11 fills in around is formed on the isolating layer 9. Then, the isolating layer 12 is formed on the heat sink part 100B. Then, the recording head part 100C is formed on the isolating layer 12. Specifically, the magnetic pole layer 13 which the insulating layer 14 fills in around, the gap layer 15 having the back gap 15BG formed therein, the insulating layer 17 having the thin film coil 16 buried therein, and the write shield layer 18 (that is, the TH defining layer 181 and the yoke layer 182) are stacked in this sequence on the isolating layer 12. Then, the overcoat layer 19 is formed on the recording head part 100C. Finally, the air bearing surface 20 is formed by use of machining and polishing. The thin film magnetic head is completed through the above-mentioned procedure.

Figure 4:
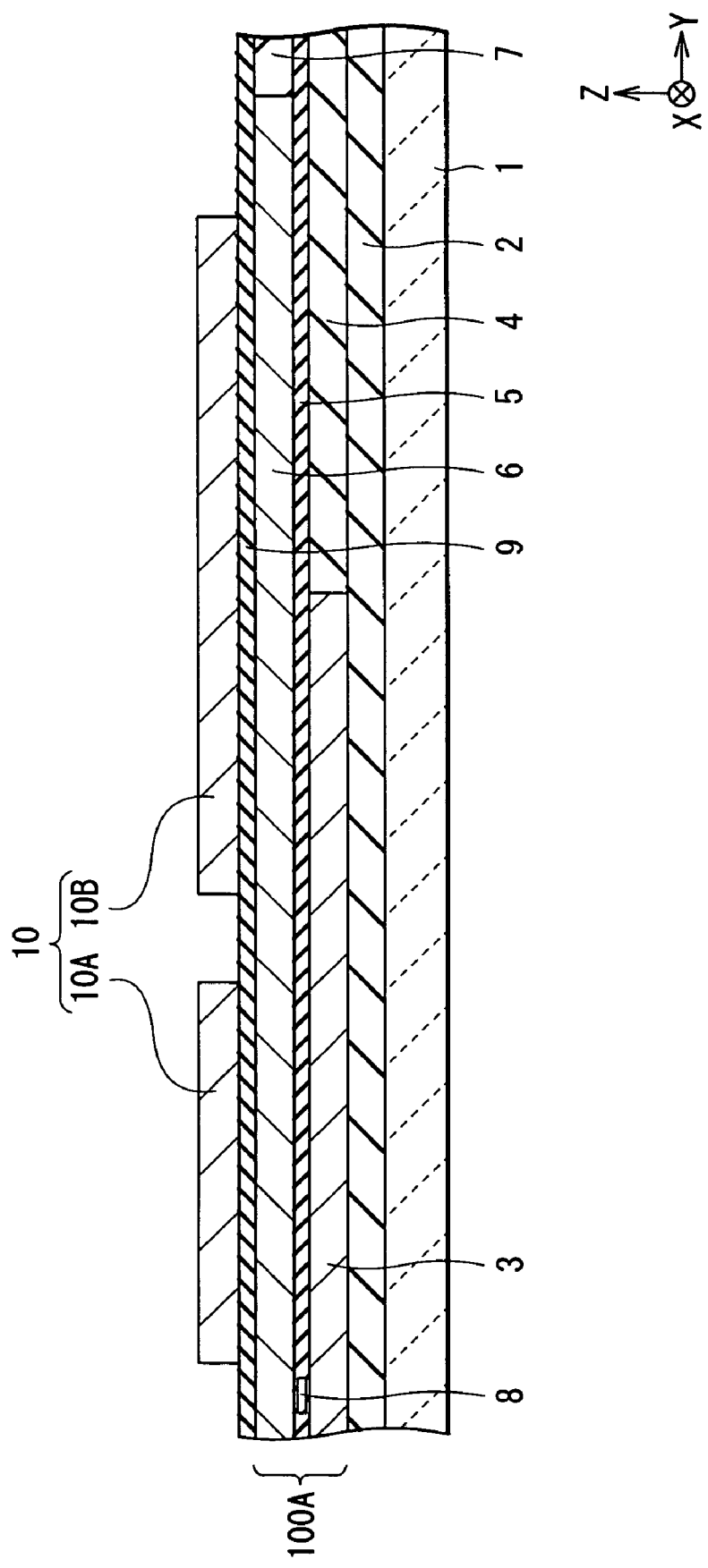
FIG. 4 is a cross-sectional view of assistance in explaining one of the steps of manufacturing the thin film magnetic head according to the first embodiment of the invention.

The principal part of the thin film magnetic head is formed in the following manner. After the formation of the isolating layer 9, the heat sink layer 10 is first formed by using, for example, plating, as shown in FIG. 4. The procedure for forming the heat sink layer 10 is, for example, as follows. First, a seed layer for plating (not shown) is formed on the isolating layer 9. Then, a photoresist film (not shown) is formed by applying a coating of photoresist to the seed layer. Then, a photoresist pattern to be used to form the heat sink layer 10 is formed by patterning the photoresist film using photolithography. Then, the heat sink layer 10 is formed by growing a plated film using the photoresist pattern in conjunction with the seed layer. The resulting heat sink layer 10 is made of the plated film. For example, as shown in FIG. 3, the heat sink layer 10 is formed in such a manner that the heat sink layer 10 is finally positioned rearward relative to the air bearing surface 20, and that the heat sink layer 10 has the partitioned structure including the frontward portion 10A and the rearward portion 10B isolated from the frontward portion 10A, wherein the frontward portion 10A is located closer to the air bearing surface 20 than the rearward portion 10B.

Figure 5:
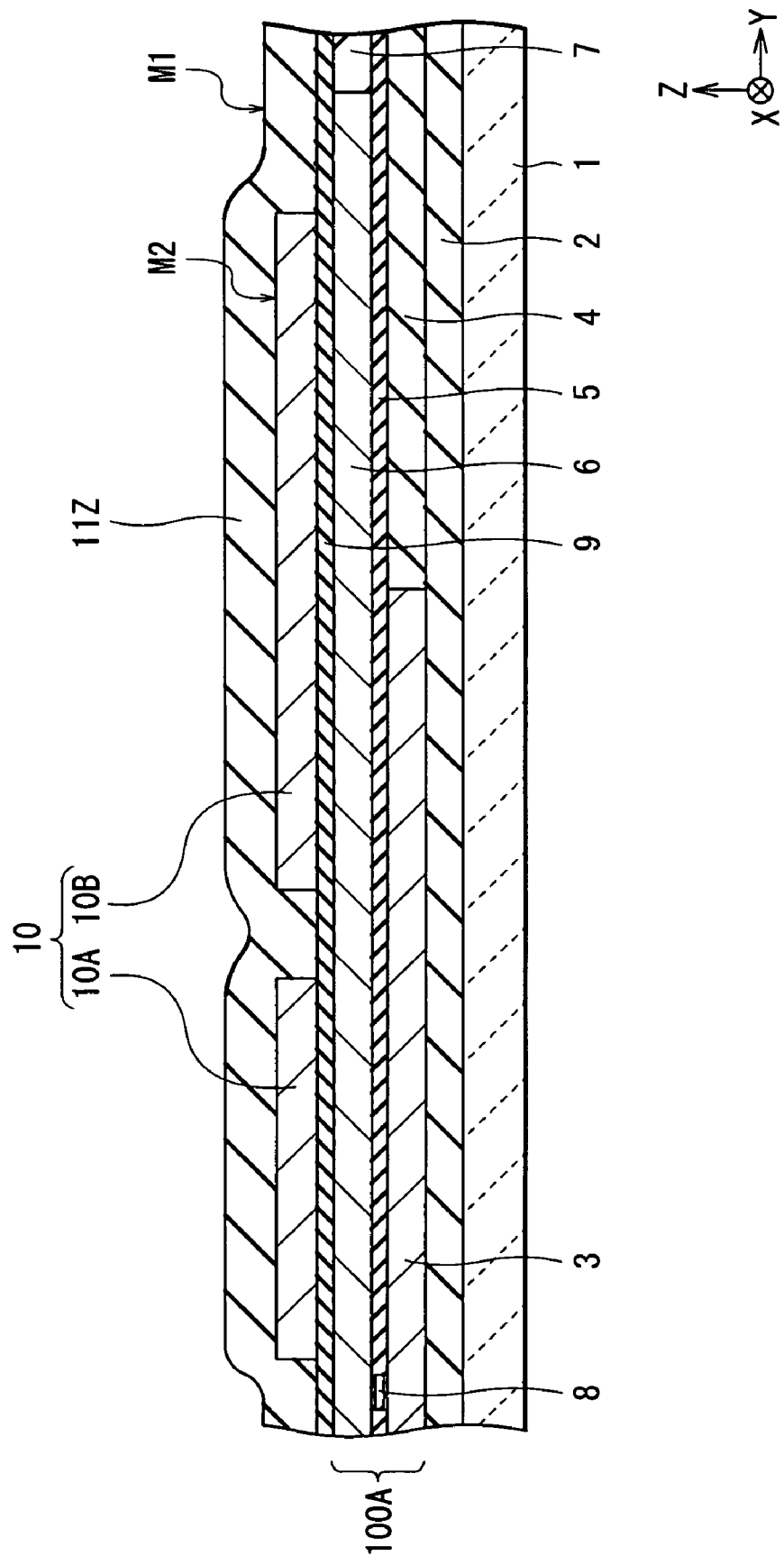
FIG. 5 is a cross-sectional view of assistance in explaining a step following the step of FIG. 4.

Then, as shown in FIG. 5, a precursory isolating layer 11Z is formed by using, for example, sputtering, so as to cover the heat sink layer 10 and its periphery. The precursory isolating layer 11Z is a preparatory layer to be polished into the isolating layer 11 in the following step. For example, the precursory isolating layer 11Z is formed with such a thickness that a bottommost surface M1 of the precursory isolating layer 11Z is positioned higher than a topmost surface M2 of the heat sink layer 10.

Figure 6:
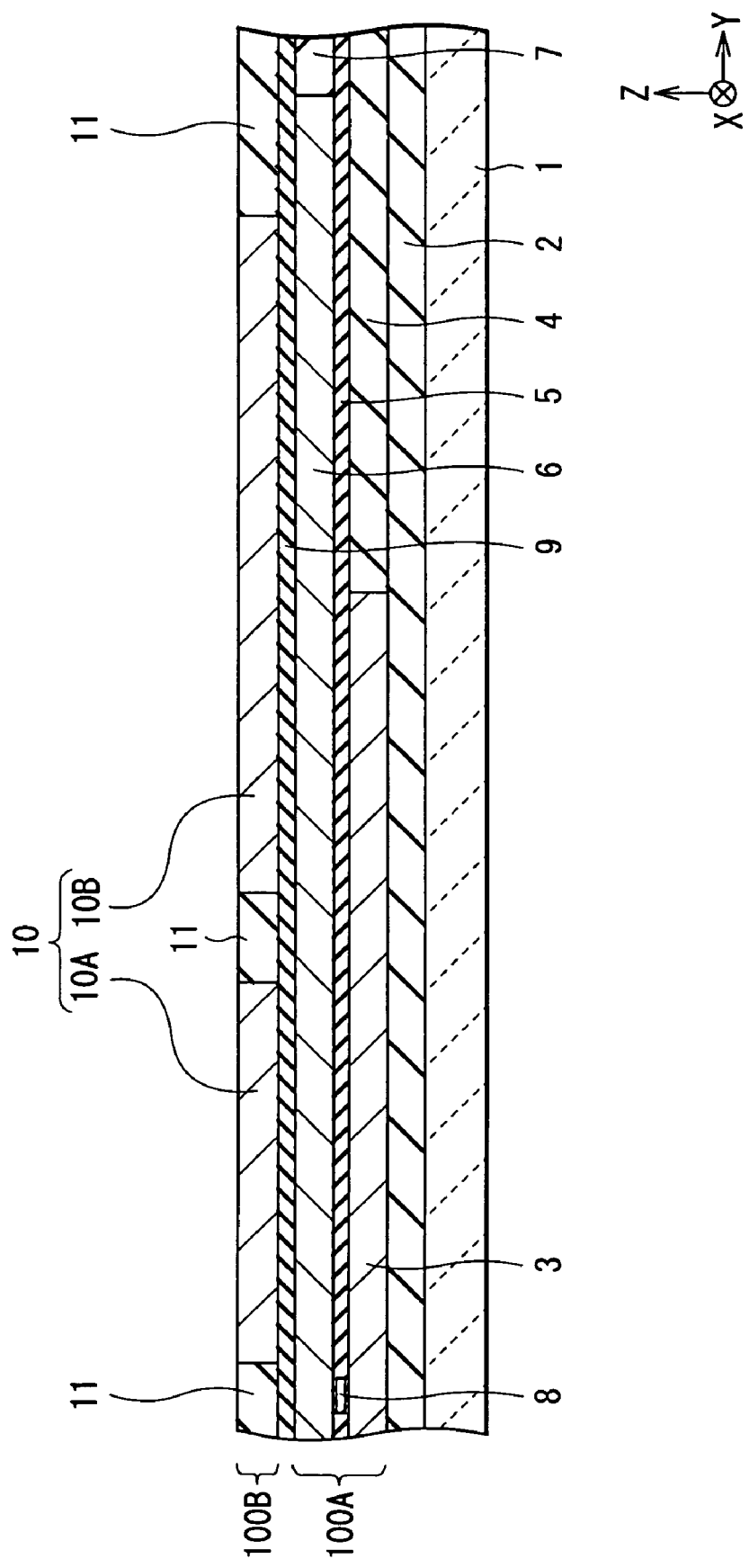
FIG. 6 is a cross-sectional view of assistance in explaining a step following the step of FIG. 5.

Then, the precursory isolating layer 11Z is polished by using, for example, CMP (chemical mechanical polishing) until at least the heat sink layer 10 is exposed. By this polishing, the isolating layer 11 is formed so as to fill in around the heat sink layer 10, as shown in FIG. 6. The heat sink part 100B is completed through the above-mentioned procedure.

Figure 7:
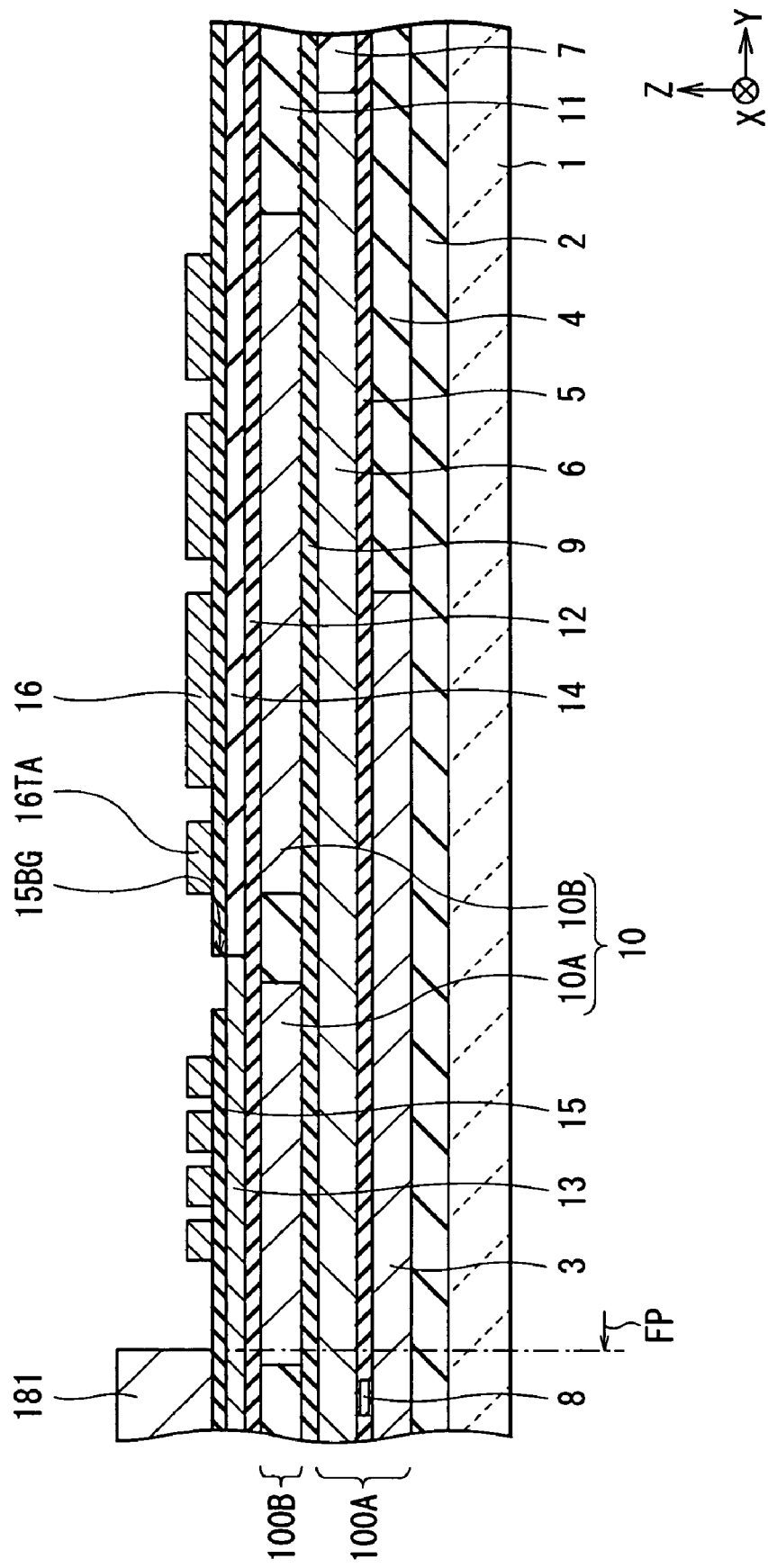
FIG. 7 is a cross-sectional view of assistance in explaining a step following the step of FIG. 6.

Then, as shown in FIG. 7, the isolating layer 12 is formed on the heat sink part 100B by using, for example, sputtering, and thereafter the magnetic pole layer 13 is formed on the isolating layer 12 by using, for example, plating. For example, as shown in FIG. 3, the magnetic pole layer 13 is formed in such a manner that the magnetic pole layer 13 is finally positioned so as to be exposed on the air bearing surface 20, and that the magnetic pole layer 13 includes the front end portion 13A of small width and the rear end portion 13B of great width, wherein the front end portion 13A is located closer to the air bearing surface 20 than the rear end portion 13B. After that, the insulating layer 14 is formed so as to fill in around the magnetic pole layer 13, by using the same technique as the above-mentioned technique for forming the isolating layer 11.

Then, the gap layer 15 is formed on the magnetic pole layer 13 and the insulating layer 14 by using, for example, sputtering. The gap layer 15 is formed so as not to cover the back gap 15BG.

Then, the TH defining layer 181 is formed by using, for example, plating, on the gap layer 15 in a frontward region relative to a region in which the thin film coil 16 is to be formed in the following step. The TH defining layer 181 is formed in such a manner that the TH defining layer 181 is positioned taking it into account that the throat height TH is determined according to the position of a rear end of the TH defining layer 181.

Then, the thin film coil 16 is formed by using, for example, plating, on the gap layer 15 between the TH defining layer 181 and the back gap 15BG. For example, as shown in FIG. 3, the thin film coil 16 is formed in such a manner that the thin film coil 16 is spirally wound around one end thereof having the terminal 16TA.

Figure 8:
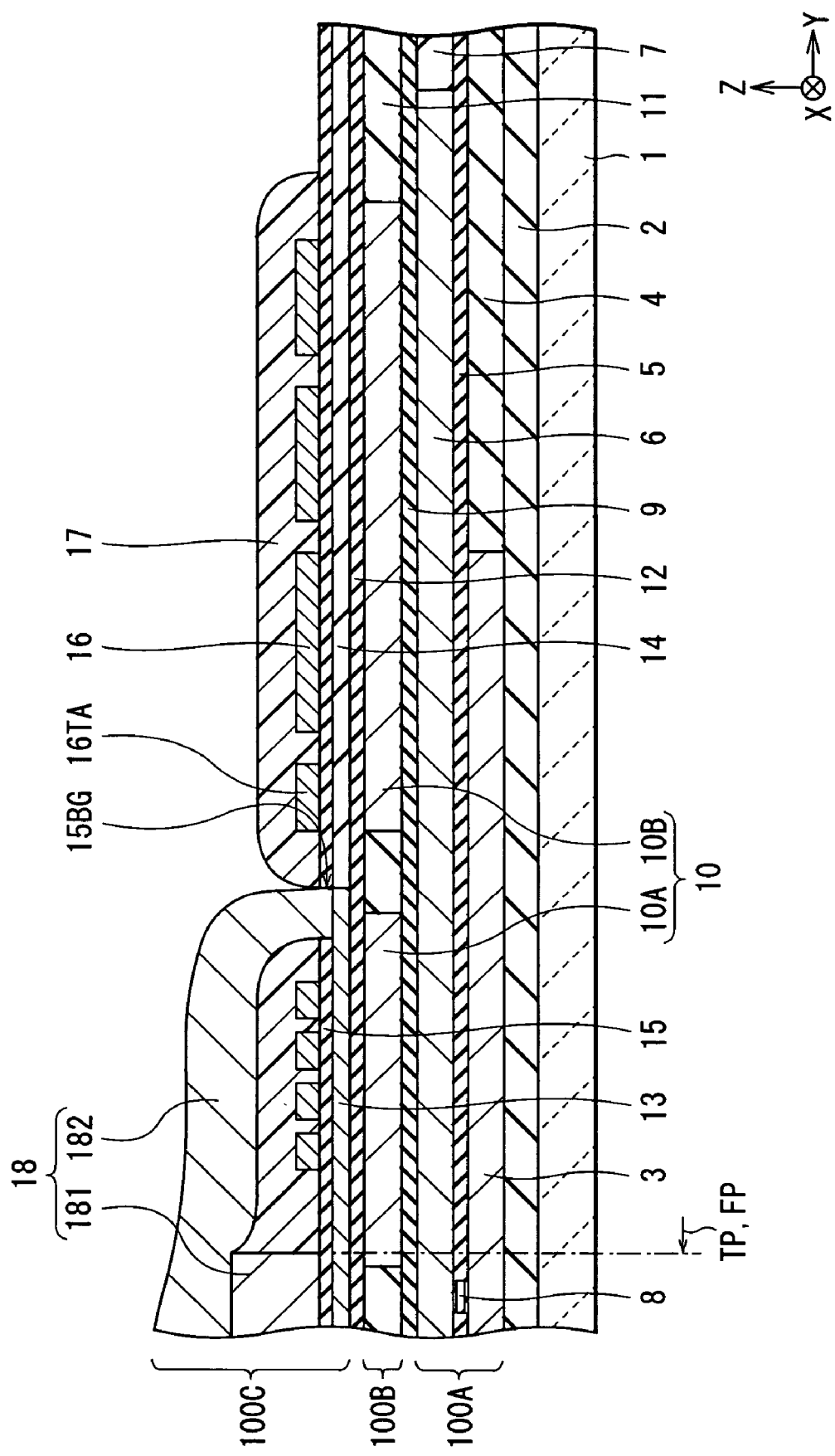
FIG. 8 is a cross-sectional view of assistance in explaining a step following the step of FIG. 7.

Then, a photoresist film (not shown) is formed by using, for example, photolithography in such a manner that the photoresist film fills in between the windings of the thin film coil 16 and covers the periphery of thin film coil 16, and that a frontward part of the photoresist film is adjacent to the TH defining layer 181. Then, the insulating layer 17 is formed by baking the photoresist film, as shown in FIG. 8. This baking imparts fluidity to the photoresist film, so that the insulating layer 17 keeps adjacent to the TH defining layer 181 in its frontward part and has the rounded slope in its rearward part. It is not necessarily required that the step of forming the thin film coil 16 follow the step of forming the TH defining layer 181. For example, the step of forming the thin film coil 16 may be followed by the step of forming the TH defining layer 181.

Finally, the yoke layer 182 is formed by using, for example, plating, so as to cover the insulating layer 17 and its periphery. The yoke layer 182 is formed in such a manner that its frontward part overlies and is magnetically coupled to the TH defining layer 181, and that its rearward part is adjacent and magnetically coupled to the magnetic pole layer 13 through the back gap 15BG. Thus, the write shield layer 18 including the TH defining layer 181 and the yoke layer 182 is formed. The recording head part 100C is completed through the above-mentioned procedure.

In the thin film magnetic head according to the first embodiment, the heat sink layer 10 for dissipating heat produced by the thin film coil 16 is disposed on the leading side of the thin film coil 16. Thus, the thin film magnetic head can reduce the amount of protrusion of the write shield layer 18, thereby prevent a collision with the recording medium, and thereby ensure a recording operation with stability. The reason is as follows.

Figure 9:
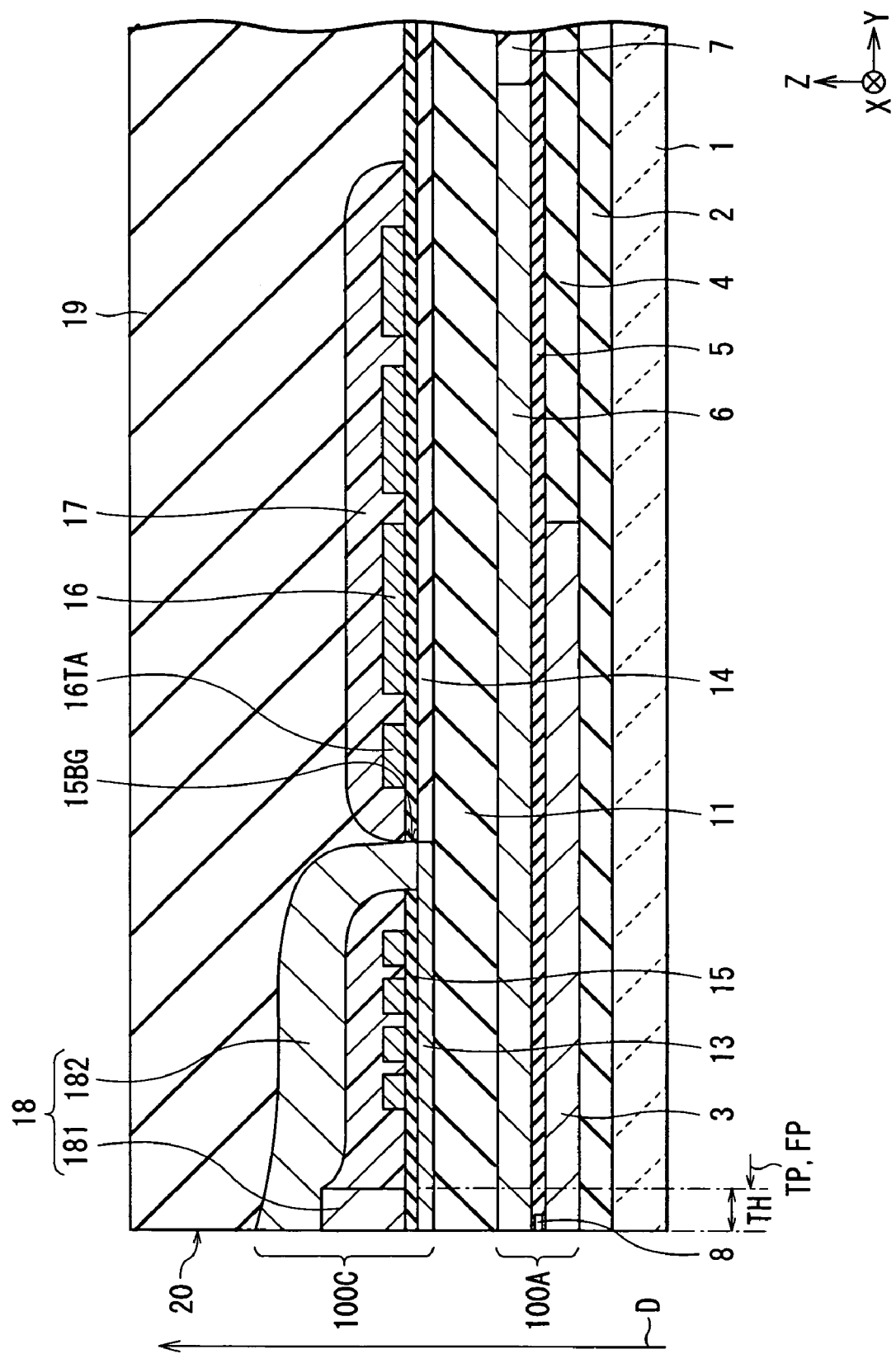
FIG. 9 is a cross-sectional view showing the cross-sectional configuration (i.e., the cross-sectional configuration perpendicular to the air bearing surface) of a thin film magnetic head of a first comparative example for the thin film magnetic head according to the first embodiment of the invention.
Figure 10:
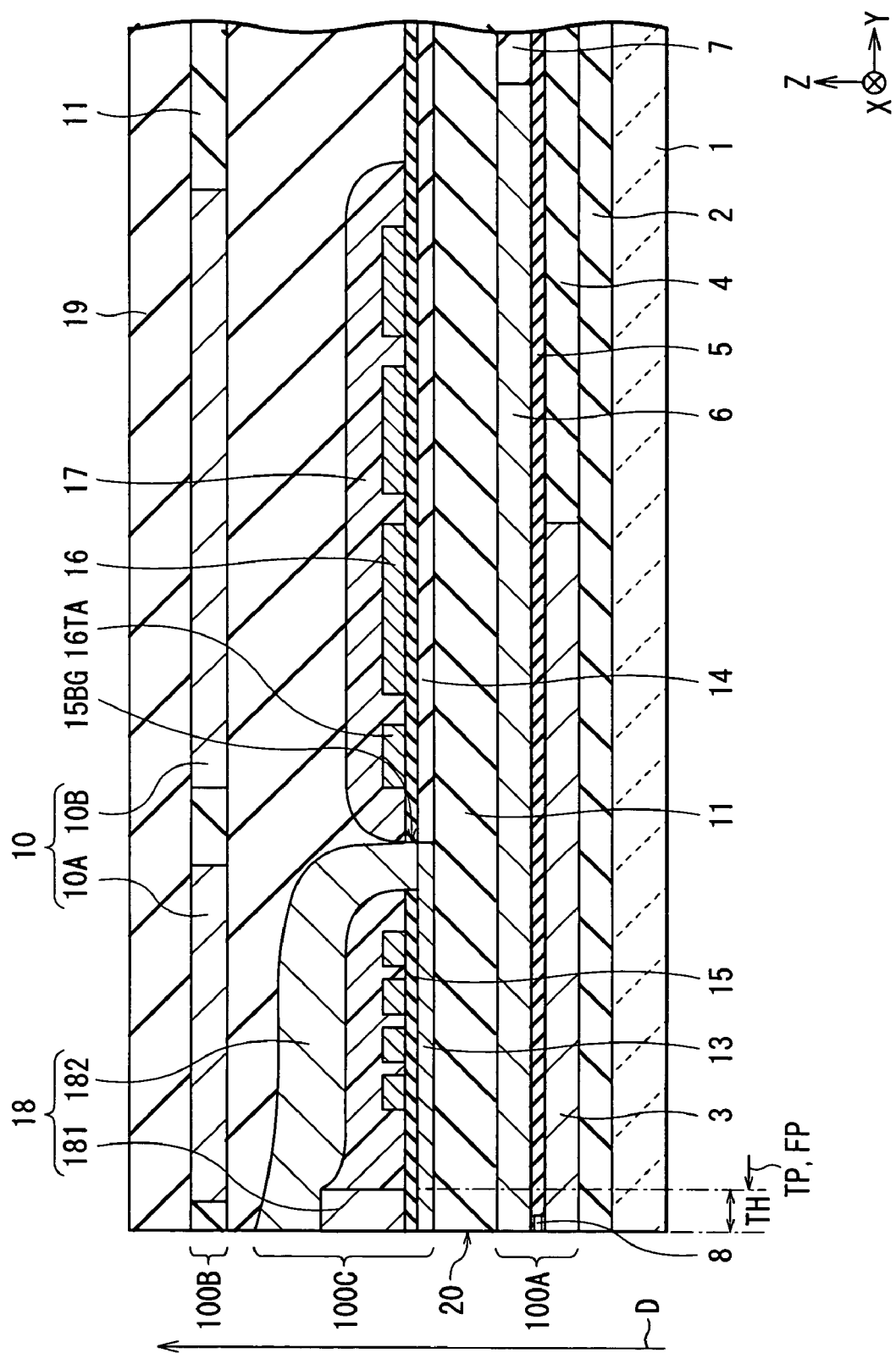
FIG. 10 is a cross-sectional view showing the cross-sectional configuration (i.e., the cross-sectional configuration perpendicular to the air bearing surface) of a thin film magnetic head of a second comparative example for the thin film magnetic head according to the first embodiment of the invention.

FIGS. 9 and 10 show the cross-sectional configurations of thin film magnetic heads of comparative examples for the thin film magnetic head according to the first embodiment (see FIG. 1). FIG. 9 shows the cross-sectional configuration of a thin film magnetic head of a first comparative example, and FIG. 10 shows the cross-sectional configuration of a thin film magnetic head of a second comparative example. The thin film magnetic head of the first comparative example shown in FIG. 9 has the same configuration as the thin film magnetic head according to the first embodiment, except that the heat sink part 100B (i.e., the heat sink layer 10) is not provided between the reproducing head part 100A and the recording head part 100C, and that the isolating layer 11 having a relatively great thickness fills in a place corresponding to the heat sink part 100B. The thin film magnetic head of the second comparative example shown in FIG. 10 has the same configuration as the thin film magnetic head according to the first embodiment, except that the heat sink part 100B (i.e., the heat sink layer 10) is disposed in the overcoat layer 19, namely, on the trailing side of the thin film coil 16, rather than between the reproducing head part 100A and the recording head part 100C, namely, on the leading side of the thin film coil 16, and that the thin film magnetic head of the second comparative example includes the isolating layer 11 having a relatively great thickness, as in the case of the thin film magnetic head of the above-mentioned first comparative example.

The thin film magnetic head of the first comparative example shown in FIG. 9 does not fundamentally include the heat sink layer 10. This structure renders it difficult to dissipate heat produced by the thin film coil 16 during the recording of information. In other words, the heat is prone to accumulate in and near the thin film coil 16. Specifically, the isolating layer 11 made of alumina having low thermal conductivity and a relatively great thickness is adjacent to the leading side of the recording head part 100C, and the overcoat layer 19 made of alumina having low thermal conductivity and a relatively great thickness in the same manner as the isolating layer 11 is adjacent to the trailing side of the recording head part 100C. In other words, the recording head part 100C is sandwiched between the isolating layer 11 and the overcoat layer 19. Thus, a thermal gradient is low between the recording head part 100C and its periphery (that is, the isolating layer 11 or the overcoat layer 19). In other words, this structure makes it difficult for the heat to escape from the recording head part 100C to the isolating layer 11 or the overcoat layer 19. As a consequence, the heat is prone to accumulate in the write shield layer 18 having high thermal conductivity. Thus, the thin film magnetic head of the first comparative example is likely to impair the recording operation. Specifically, too large an amount of heat accumulating in the write shield layer 18 causes thermal expansion of the write shield layer 18 under the influence of thermal energy, thus causes considerable protrusion of the write shield layer 18 beyond the air bearing surface 20, thus causes a collision of the write shield layer 18 with the rotating recording medium, and thus leads to impairment of the recording operation.

In the thin film magnetic head of the second comparative example shown in FIG. 10, the isolating layer 11 made of alumina having low thermal conductivity and a relatively great thickness is adjacent to the leading side of the recording head part 100C, while the heat sink layer 10 having high thermal conductivity is disposed in the overcoat layer 19, namely, on the trailing side of the recording head part 100C. This structure allows dissipating, via the heat sink layer 10, heat produced by the thin film coil 16 during the recording of information. In this case, the heat, however, can still accumulate in the write shield layer 18, depending on the amount of heat produced by the thin film coil 16, because, in the process of dissipating the heat via the heat sink layer 10, priority is given to the guidance of the heat to the trailing side of the thin film coil 16, namely, the position of the write shield layer 18, due to the structural factor that the heat sink layer 10 is disposed on the trailing side of the thin film coil 16. Thus, the thin film magnetic head of the second comparative example may impair the recording operation, as in the case of the thin film magnetic head of the above-mentioned first comparative example. Specifically, too large an amount of heat accumulating in the write shield layer 18 leads to a large amount of protrusion of the write shield layer 18, thus causes a collision of the write shield layer 18 with the recording medium, and thus results in impairment of the recording operation.

In the thin film magnetic head according to the first embodiment shown in FIG. 1, the overcoat layer 19 made of alumina having low thermal conductivity and a relatively great thickness is adjacent to the trailing side of the recording head part 100C, while the heat sink layer 10 having high thermal conductivity is disposed on the leading side of the recording head part 100C. As a matter of course, this structure allows dissipating heat produced by the thin film coil 16 via the heat sink layer 10, as in the case of the thin film magnetic head of the second comparative example including the heat sink layer 10, as distinct from the thin film magnetic head of the first comparative example not including the heat sink layer 10. Moreover, when the thin film coil 16 produces heat during the recording of information, the thin film magnetic head according to the first embodiment gives priority to the guidance of the heat to the leading side of the thin film coil 16, namely, the side opposite to the position of the write shield layer 18, rather than the guidance of the heat to the trailing side of the thin film coil 16, namely, the position of the write shield layer 18, so as to dissipate the heat, as discussed in the above description of "the operation of the thin film magnetic head". Thus, the thin film magnetic head according to the first embodiment reduces the likelihood of the heat accumulating in the write shield layer 18 and thus reduces the likelihood of the write shield layer 18 expanding thermally, as compared to the thin film magnetic head of the second comparative example in which the heat produced by the thin film coil 16 is guided to the position of the write shield layer 18 so as to be dissipated, due to the structural factor that the heat sink layer 10 is disposed on the trailing side of the thin film coil 16. Therefore, the thin film magnetic head according to the first embodiment can reduce the amount of protrusion of the write shield layer 18, thus prevent the write shield layer 18 from colliding with the recording medium, and thus ensure the recording operation with stability.

In the thin film magnetic head according to the first embodiment, the heat sink layer 10 is disposed on the leading side of the thin film coil 16. Thus, the thin film magnetic head according to the first embodiment can contribute to a stable recording operation for the following reasons, as well as the above-mentioned reasons associated with the state of heat accumulating in the write shield layer 18.

As described above, the thin film magnetic head of the first embodiment including the heat sink layer 10 disposed on the leading side of the thin film coil 16 reduces the likelihood of heat accumulating in the write shield layer 18, as compared to the thin film magnetic head of the second comparative example (see FIG. 10). In the first embodiment, too large an amount of heat, however, may accumulate in the write shield layer 18, depending on the amount of heat produced by the thin film coil 16. It thus seems that, in some instances, the first embodiment may still cause an increase in the amount of protrusion of the write shield layer 18, as in the case of the second comparative example. However, in the first embodiment, heat guided to the heat sink layer 10 is further guided to the substrate 1 via the top and bottom read shield layers 6 and 3 having high thermal conductivity, by reason of the structural feature that the heat sink layer 10 is disposed on the leading side of the thin film coil 16. Thus, not only the heat sink layer 10 but also the substrate 1 can be finally utilized as a heat dissipation path. The substrate 1 is made of $Al_2O_3$—TiC fine ceramics which are inferior in thermal conductivity to metal but are superior in thermal conductivity to alumina. The heat dissipation characteristics of the substrate 1 are not as excellent as those of the heat sink layer 10 having high thermal conductivity, simply in terms of material characteristics. However, the heat dissipation characteristics of the substrate 1 are greatly superior to those of the heat sink layer 10 in terms of the absolute value of the amount of heat conduction, because the substrate 1 has a bulk structure much thicker than the heat sink layer 10, as distinct from the heat sink layer 10 in the form of a thin film. Thus, the thin film magnetic head of the first embodiment can utilize the substrate 1 as well as the heat sink layer 10 as the heat dissipation path, thus markedly improve the efficiency of heat dissipation, and thus greatly reduce the amount of protrusion of the write shield layer 18. Also from this viewpoint, the thin film magnetic head of the first embodiment can therefore contribute to a stable recording operation.

The thin film magnetic head of the first embodiment also reduces the amount of protrusion of the magnetic pole layer 13 by utilizing the heat dissipation function of the heat sink layer 10 to reduce the amount of heat accumulating in the magnetic pole layer 13 as well as the write shield layer 18. Thus, the thin film magnetic head of the first embodiment can also prevent the magnetic pole layer 13 from colliding with the recording medium. Also from this viewpoint, the thin film magnetic head of the first embodiment can therefore contribute to a stable recording operation.

In the first embodiment, the heat sink layer 10 is located in close proximity to the magnetic pole layer 13 with the isolating layer 12 in between. Thus, the thin film magnetic head of the first embodiment can further reduce the amount of protrusion of the magnetic pole layer 13, as compared to the thin film magnetic head of the second comparative example (see FIG. 10) in which the heat sink layer 10 is located far away from the magnetic pole layer 13. The reason is as follows. In the magnetic pole layer 13, heat is prone to locally accumulate in the front end portion 13A of narrow width due to a convergence of magnetic flux. For a reduction in the amount of protrusion of the magnetic pole layer 13, it is therefore important that the heat sink layer 10 be located as close to the magnetic pole layer 13 as possible so that the heat sink layer 10 is utilized to reduce the amount of heat accumulating in the front end portion 13A. With this consideration, the thin film magnetic head of the first embodiment can utilize the heat sink layer 10 to more effectively reduce the amount of heat accumulating in the front end portion 13A, because the heat sink layer 10 of the first embodiment is located closer to the magnetic pole layer 13 than that of the second comparative example. Accordingly, the thin film magnetic head of the first embodiment can further reduce the amount of protrusion of the magnetic pole layer 13.

In the first embodiment, the heat sink layer 10 is made of the material having higher thermal conductivity than the write shield layer 18. When the thin film coil 16 produces heat, priority is thus given to the conduction of the heat to the heat sink layer 10 rather than the write shield layer 18. Therefore, the thin film magnetic head of the first embodiment can more effectively prevent heat from accumulating in the write shield layer 18, thus enabling a further reduction in the amount of protrusion of the write shield layer 18. As for this respect, the thin film magnetic head of the first embodiment can further reduce the amount of protrusion of the magnetic pole layer 13 by utilizing the same function as the function described above with regard to the write shield layer 18, because the heat sink layer 10 is made of the material having higher thermal conductivity than the magnetic pole layer 13.

In this instance, the heat sink layer 10 is made of the material having a lower coefficient of thermal expansion than the write shield layer 18. Thus, the amount of thermal expansion of the heat sink layer 10 of the thin film magnetic head including both the write shield layer 18 and the heat sink layer 10 is smaller than the amount of thermal expansion of the write shield layer 18 of the thin film magnetic head not including the heat sink layer 10. Even if the presence of the heat sink layer 10 causes heat accumulation in the heat sink layer 10 instead of the write shield layer 18, the thin film magnetic head of the first embodiment can therefore minimize the amount of protrusion of the heat sink layer 10 resulting from the accumulated heat. As for this respect, the thin film magnetic head of the first embodiment can minimize the amount of protrusion of the heat sink layer 10 of the thin film magnetic head including both the magnetic pole layer 13 and the heat sink layer 10, by utilizing the same function as the function described above with regard to the write shield layer 18, because the heat sink layer 10 is made of the material having a lower coefficient of thermal expansion than the magnetic pole layer 13.

In the first embodiment, the heat sink layer 10 is made of the nonmagnetic material. Thus, the heat sink layer 10 functions to provide magnetic isolation between the recording head part 100C and the reproducing head part 100A. Thus, the thin film magnetic head of the first embodiment can prevent unintended leakage of a magnetic flux flowing through the recording head part 100C (i.e., the magnetic pole layer 13 or the write shield layer 18) into the reproducing head part 100A (i.e., the top read shield layer 6 or the bottom read shield layer 3) via the heat sink layer 10 during the recording of information. Also from this viewpoint, the thin film magnetic head of the first embodiment can therefore contribute to a stable recording operation.

In the first embodiment, the heat sink layer 10 is disposed in the region corresponding to the region in which the thin film coil 16 is disposed, and the contour of the plan configuration of the heat sink layer 10 is larger than the contour of the plan configuration of the thin film coil 16. This structure allows the heat sink layer 10 to face the overall thin film coil 16, thus ensuring a heat conducting path to the heat sink layer 10 throughout the thin film coil 16. Thus, the thin film magnetic head of the first embodiment permits smooth conduction of most of heat produced by the thin film coil 16 to the heat sink layer 10 and thus reduces the likelihood of the heat accumulating in the magnetic pole layer 13 or the write shield layer 18, as distinct from the thin film magnetic head in which the contour of the plan configuration of the heat sink layer 10 is smaller than the contour of the plan configuration of the thin film coil 16. Also from this viewpoint, the thin film magnetic head of the first embodiment can therefore contribute to the reduced amount of heat accumulating in the magnetic pole layer 13 or the write shield layer 18.

In the first embodiment, the top read shield layer 6 is disposed in the region corresponding to the region in which the heat sink layer 10 is disposed, and the contour of the plan configuration of the top read shield layer 6 is larger than the contour of the plan configuration of the heat sink layer 10. The top read shield layer 6 functions as a guide path to guide, to the substrate 1, heat conducted from the thin film coil 16 to the heat sink layer 10. The structure of the first embodiment allows the top read shield layer 6 to face the overall heat sink layer 10, thus ensuring a heat guide path to the top read shield layer 6 throughout the heat sink layer 10. Thus, the thin film magnetic head of the first embodiment permits most of heat conducted to the heat sink layer 10 to be smoothly conducted to the top read shield layer 6 and thus reduces the likelihood of the heat accumulating in the heat sink layer 10, as distinct from the thin film magnetic head in which the contour of the plan configuration of the top read shield layer 6 is smaller than the contour of the plan configuration of the heat sink layer 10. Also from this viewpoint, the thin film magnetic head of the first embodiment can therefore contribute to the reduced amount of heat accumulating in the heat sink layer 10.

In the first embodiment, the heat sink layer 10 is located rearward relative to the air bearing surface 20. Thus, the thin film magnetic head of the first embodiment can prevent the heat sink layer 10 from projecting beyond the air bearing surface 20 at the occurrence of thermal expansion of the heat sink layer 10 in itself under the influence of heat produced by the thin film coil 16.

In the first embodiment, the heat sink layer 10 has the partitioned structure in which the heat sink layer 10 is partitioned into a plurality of portions in the direction in which the heat sink layer 10 extends. Specifically, the heat sink layer 10 includes the frontward portion 10A and the rearward portion 10B. Thus, the thin film magnetic head of the first embodiment reduces the amount of thermal expansion of the heat sink layer 10 in a frontward direction (i.e., nearer to the air bearing surface 20) at the occurrence of thermal expansion of the heat sink layer 10 in itself, as compared to the thin film magnetic head including the heat sink layer 10 having a single continuous structure in the direction in which the heat sink layer 10 extends. Therefore, the thin film magnetic head of the first embodiment can minimize the amount of protrusion of the heat sink layer 10 resulting from thermal expansion of the heat sink layer 10.

The method of manufacturing the thin film magnetic head according to the first embodiment uses only existing manufacturing processes such as patterning, deposition, and polishing, rather than novel and complicated manufacturing processes, in order to accomplish the continuous, highly reproducible manufacture of the thin film magnetic head including the heat sink part 100B comprising the heat sink layer 10 and the isolating layer 11 which fills in around the heat sink layer 10. Therefore, the method can manufacture, with stability and ease, the thin film magnetic head which can reduce the amount of protrusion of the write shield layer 18, thus prevent the write shield layer 18 from colliding with the recording medium, and thus ensure the recording operation with stability.

Figure 11:
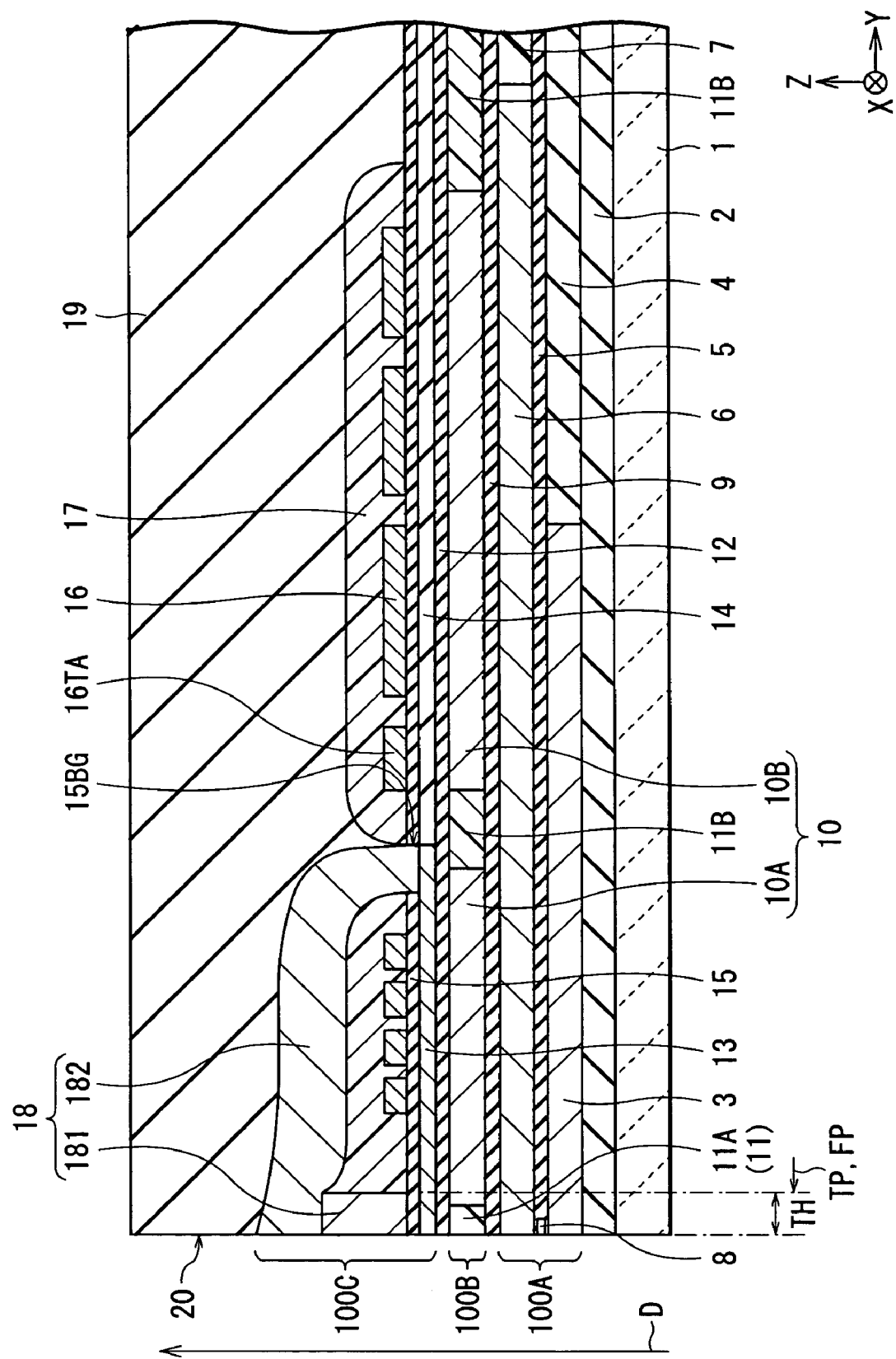
FIG. 11 is a cross-sectional view of assistance in explaining a modified example of the configuration of the thin film magnetic head according to the first embodiment of the invention.

In the above-mentioned embodiment, the isolating layer 11 which fills in around the heat sink layer 10 (i.e., the frontward portion 10A and the rearward portion 10B) is wholly made of a hard material such as alumina. However, the isolating layer 11 is not necessarily limited to this material but may be partially made of a soft material having elasticity, such as a photoresist. Specifically, for example as shown in FIG. 11, an isolating layer 11B of the isolating layer 11 may be made of a photoresist, and only an isolating layer 11A of the isolating layer 11 may be made of hard alumina. In this instance, the isolating layer 11B is a portion of the isolating layer 11 located rearward relative to the frontward portion 10A, and the isolating layer 11A is the remaining portion of the isolating layer 11, that is, a portion exposed on the air bearing surface 20. In a thin film magnetic head shown in FIG. 11, only the front end of the frontward portion 10A is substantially a fixed end utilizing the action of non-deformation of the isolating layer 11A made of hard alumina, while the rear end of the frontward portion 10A and the front and rear ends of the rearward portion 10B are substantially free ends utilizing the action of elastic deformation of the isolating layer 11B made of a soft photoresist, as distinct from the above-mentioned embodiment in which the ends of the heat sink layer 10 in the length direction (i.e., in the direction along the Y axis), namely, all of the respective front and rear ends of the frontward and rearward portions 10A and 10B, may be substantially fixed ends due to hard alumina or the like which the isolating layer 11 is wholly made of. Thus, for example even if the heat sink layer 10 expands thermally due to heat produced by the thin film coil 16, thermal expansion stress is not transmitted frontward (i.e., nearer to the air bearing surface 20) but is transmitted rearward (i.e., away from the air bearing surface 20), and the stress is balanced in the thin film magnetic head by utilizing the action of shrinkage deformation of the photoresist. Therefore, the thin film magnetic head shown in FIG. 11 reduces the likelihood of protrusion of the isolating layer 11 resulting from the phenomenon of thermal expansion of the heat sink layer 10, and thus enables a more effective reduction in the amount of protrusion of the overall thin film magnetic head. Incidentally, the features of the configuration of the thin film magnetic head shown in FIG. 11, except the above-mentioned features, are the same as those of the configuration of the thin film magnetic head shown in FIG. 1.

In the isolating layer 11 shown in FIG. 11, the portion of the isolating layer 11 located rearward relative to the frontward portion 10A (that is, the isolating layer 11B) is made of a photoresist, and the remaining portion of the isolating layer 11 (that is, the isolating layer 11A) is made of alumina. However, the isolating layer 11 is not necessarily limited to this configuration. The configuration of the isolating layer 11 may be freely changed, provided only that both the action of non-deformation of alumina and the action of elastic deformation of a photoresist can be utilized to prevent the isolating layer 11 from projecting, as mentioned above. As an example of the configuration of the isolating layer 11 (not shown) other than the isolating layer 11 shown in FIG. 11, a portion of the isolating layer 11 exposed on the air bearing surface 20, that is, a frontward portion of the above-mentioned isolating layer 11A exposed on the air bearing surface 20, may be made of alumina, and the remaining portion of the isolating layer 11, that is, both a rearward portion of the above-mentioned isolating layer 11A and the isolating layer 11B, may be made of a photoresist. This photoresist is to fill in around the heat sink layer 10 (i.e., the frontward portion 10A and the rearward portion 10B). The isolating layer 11 having this configuration can achieve the same effect as the isolating layer 11 shown in FIG. 11.

The description has been given with regard to the above-mentioned embodiment by taking an example of the configuration of the heat sink layer 10 and its peripheral structure as shown in FIG. 1. However, the heat sink layer 10 and its peripheral structure are not necessarily limited to this configuration. The configuration of the heat sink layer 10 and its peripheral structure may be freely modified according to conditions such as the amount of heat produced by the thin film coil 16, the amount of heat accumulating in the thin film magnetic head, or the amount of protrusion of the magnetic pole layer 13 or the write shield layer 18. The description is given below with reference to FIGS. 12 to 16 corresponding to FIG. 1 with regard to some modified examples of the configuration of the heat sink layer 10 and its peripheral structure. Thin film magnetic heads shown in FIGS. 12 to 16 can achieve about the same effect as the thin film magnetic head of the above-mentioned embodiment. Incidentally, the features of the configurations of the thin film magnetic heads shown in FIGS. 12 to 16, except the following features, are the same as those of the configuration of the thin film magnetic head shown in FIG. 1.

Figure 12:
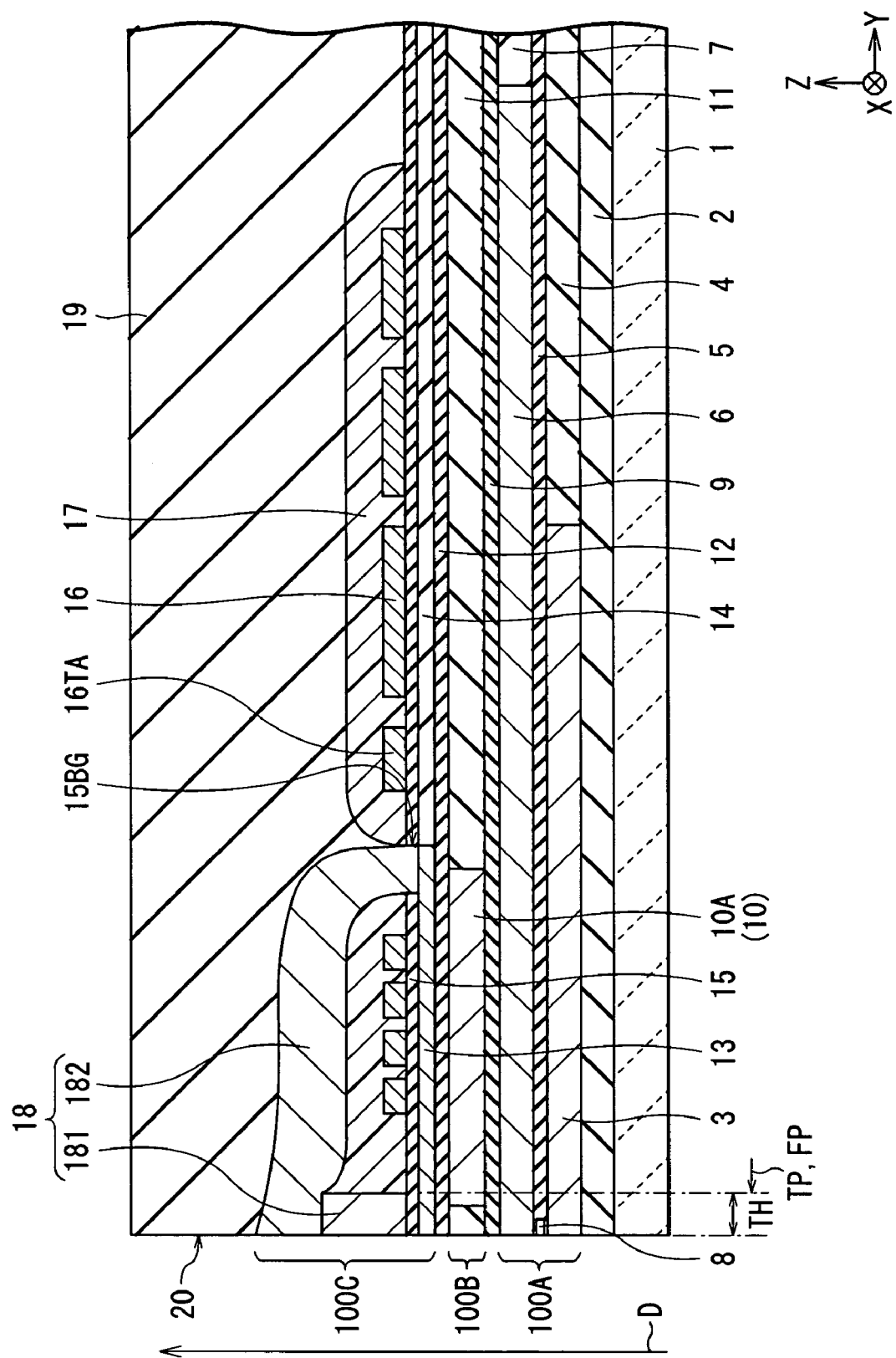
FIG. 12 is a cross-sectional view of assistance in explaining a first modified example of the configuration of a heat sink layer and its peripheral structure.
Figure 13:
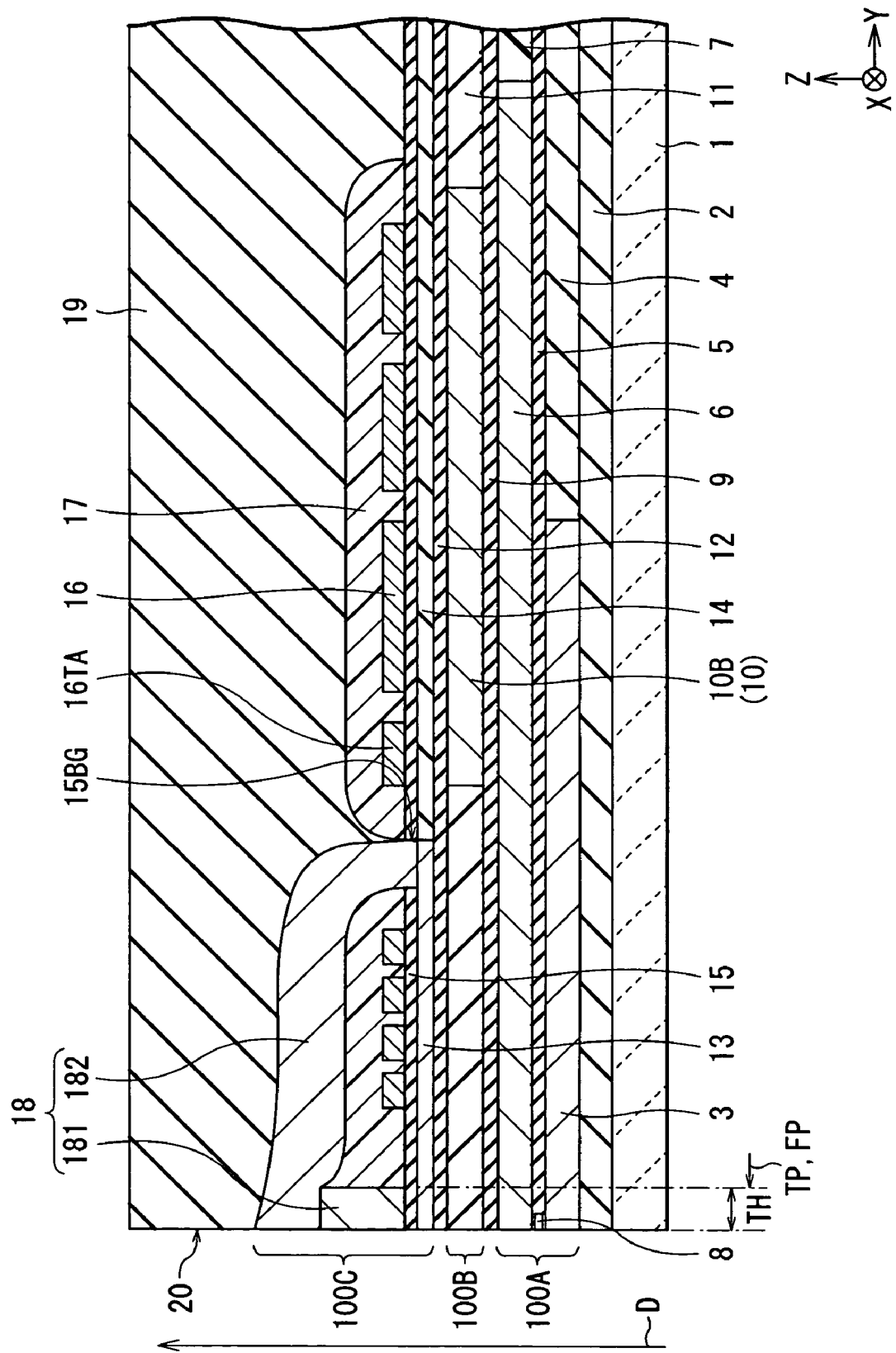
FIG. 13 is a cross-sectional view of assistance in explaining another form of the first modified example of the configuration of the heat sink layer and its peripheral structure.

Specific examples are given below. Firstly, the heat sink layer 10 may comprise only the frontward portion 10A as shown in FIG. 12 or only the rearward portion 10B as shown in FIG. 13, although in the above-mentioned embodiment the heat sink layer 10 comprises both the frontward portion 10A and the rearward portion 10B. In the thin film magnetic head including the heat sink layer 10 comprising only the frontward portion 10A (see FIG. 12), the heat sink layer 10 (i.e., the frontward portion 10A) is disposed only in a region corresponding to a part of the thin film coil 16 which produces a larger amount of heat, specifically the frontward part of the thin film coil 16, particularly because the amount of heat produced by the thin film coil 16 in its frontward part is larger than the amount of heat produced by the thin film coil 16 in its rearward part due to the structural factor that the winding width and the winding pitch of the thin film coil 16 in its frontward part are smaller than the winding width and the winding pitch thereof in its rearward part, that is, the windings are located in close proximity to one another in the frontward part, as shown in FIG. 3. Thus, the thin film magnetic head including the heat sink layer 10 comprising only the frontward portion 10A enables the selective, effective prevention of the phenomenon of heat accumulation in and near the thin film coil 16, as compared to the thin film magnetic head including the heat sink layer 10 comprising only the rearward portion 10B. In the thin film magnetic head including the heat sink layer 10 comprising only the rearward portion 10B (see FIG. 13), the heat sink layer 10 (i.e., the rearward portion 10B) is disposed only in a region corresponding to a part of the thin film coil 16 which does not produce too large an amount of heat, specifically the rearward part of the thin film coil 16, particularly because the amount of heat produced by the thin film coil 16 in its frontward part is larger than the amount of heat produced by the thin film coil 16 in its rearward part as mentioned above. Thus, the thin film magnetic head including the heat sink layer 10 comprising only the rearward portion 10B can prevent an increase in the amount of protrusion of the overall thin film magnetic head resulting from the phenomenon of thermal expansion of the heat sink layer 10 in itself, as compared to the thin film magnetic head including the heat sink layer 10 comprising only the frontward portion 10A.

Figure 14:
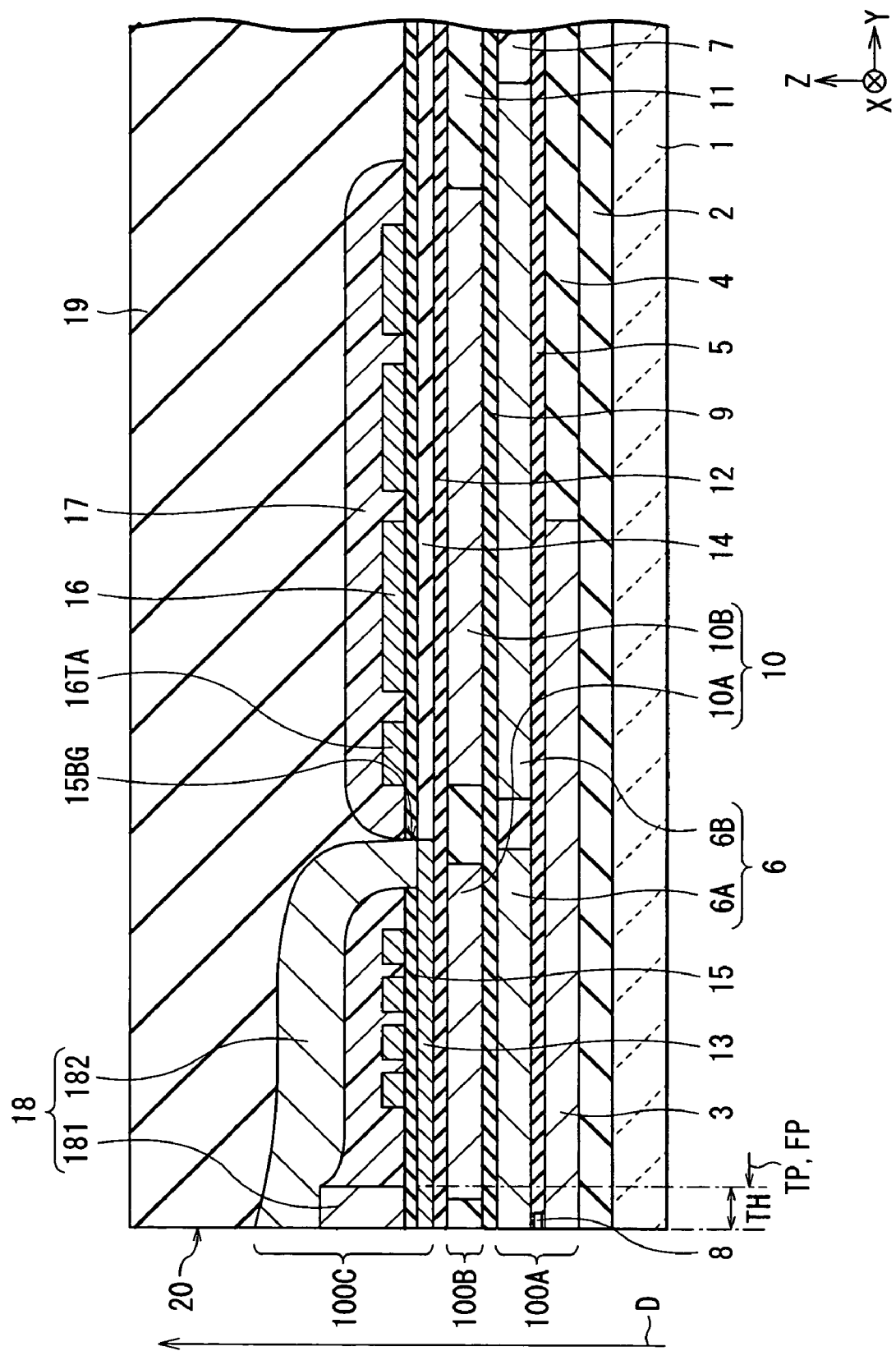
FIG. 14 is a cross-sectional view of assistance in explaining a second modified example of the configuration of the heat sink layer and its peripheral structure.

Secondly, the top read shield layer 6 may have a partitioned structure as in the case of the heat sink layer 10 (i.e., the frontward portion 10A and the rearward portion 10B), although in the above-mentioned embodiment the top read shield layer 6 has a single continuous structure. Specifically, as shown in FIG. 14, the top read shield layer 6 may include a frontward portion 6A (or a first read shield layer portion) which is located corresponding to the frontward portion 10A, and a rearward portion 6B (or a second read shield layer portion) which is located corresponding to the rearward portion 10B and is isolated from the frontward portion 6A. The insulating layer 7 fills in between the frontward portion 6A and the rearward portion 6B. In this instance, when heat is guided from the heat sink layer 10 to the substrate 1 via the top read shield layer 6, heat produced by the thin film coil 16 in its frontward part is guided to the substrate 1 via the frontward portions 10A and 6A, and heat produced by the thin film coil 16 in its rearward part is guided to the substrate 1 via the rearward portions 10B and 6B. In other words, separate paths are used to guide to the substrate 1 the heat produced by the thin film coil 16 in its frontward part and the heat produced by the thin film coil 16 in its rearward part. For example, the frontward portions 10A and 6A are thus made of a material having higher thermal conductivity than the rearward portions 10B and 6B, in consideration of the fact that the thin film coil 16 produces a larger amount of heat in its frontward part. This configuration enables more efficient dissipation of heat produced by the thin film coil 16.

Figure 15:
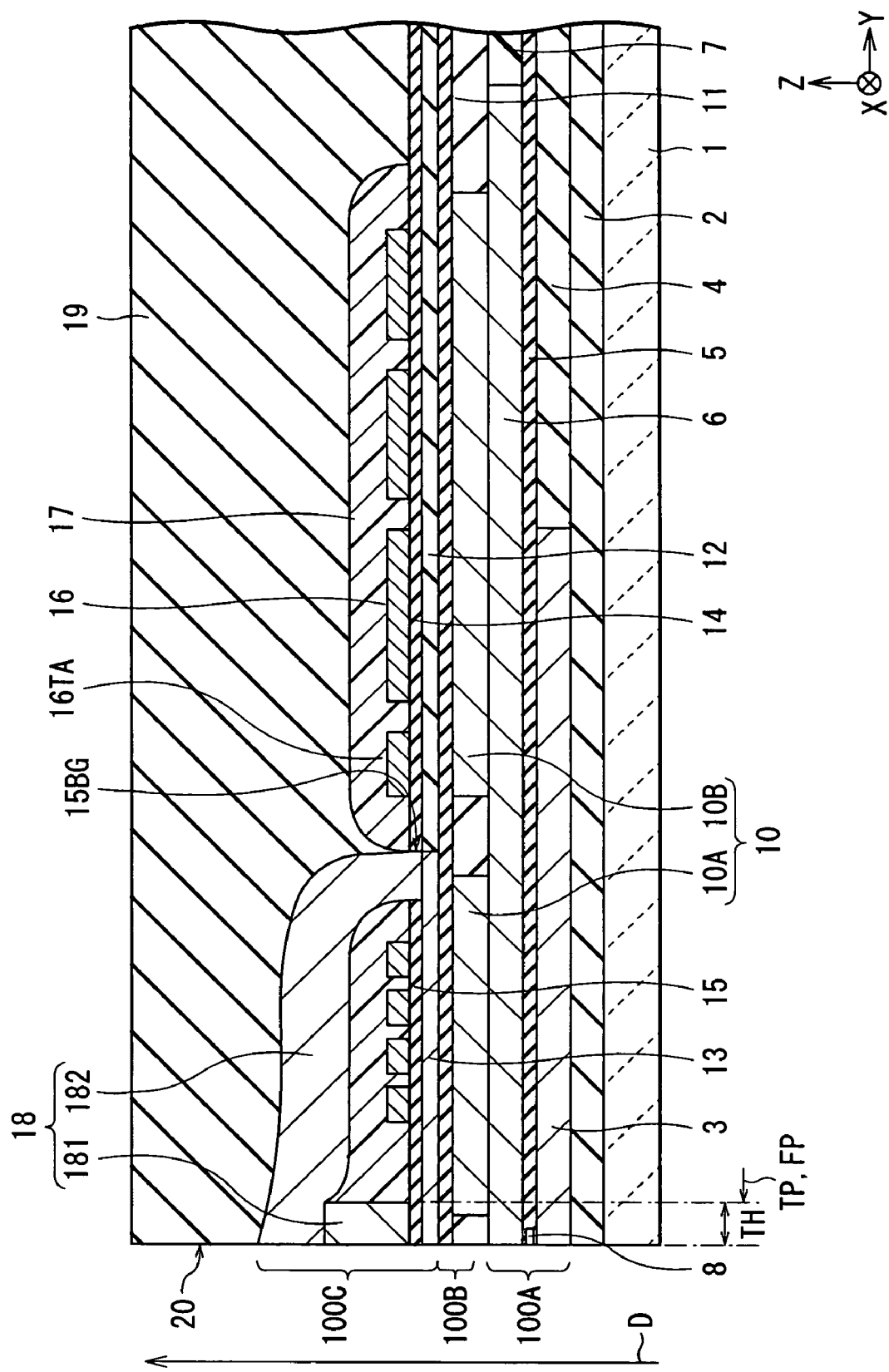
FIG. 15 is a cross-sectional view of assistance in explaining a third modified example of the configuration of the heat sink layer and its peripheral structure.

Thirdly, the isolating layer 9 is not necessarily required, although in the above-mentioned embodiment the isolating layer 9 is disposed between the heat sink layer 10 and the top read shield layer 6 so that the heat sink layer 10 is electrically isolated from the top read shield layer 6 with the isolating layer 9 in between. Specifically, as shown in FIG. 15, the isolating layer 9 may be absent from the thin film magnetic head so that the heat sink layer 10 is adjacent to the top read shield layer 6. In this instance, the isolating layer 9 made of alumina having low thermal conductivity is not present between the heat sink layer 10 and the top read shield layer 6, so that the heat sink layer 10 is in contact with the top read shield layer 6. Thus, the thin film magnetic head not including the isolating layer 9 improves the efficiency of heat conduction from the heat sink layer 10 to the top read shield layer 6, as compared to the thin film magnetic head of the above-mentioned embodiment including the isolating layer 9. Therefore, the thin film magnetic head shown in FIG. 15 enables more efficient dissipation of heat produced by the thin film coil 16.

Figure 16:
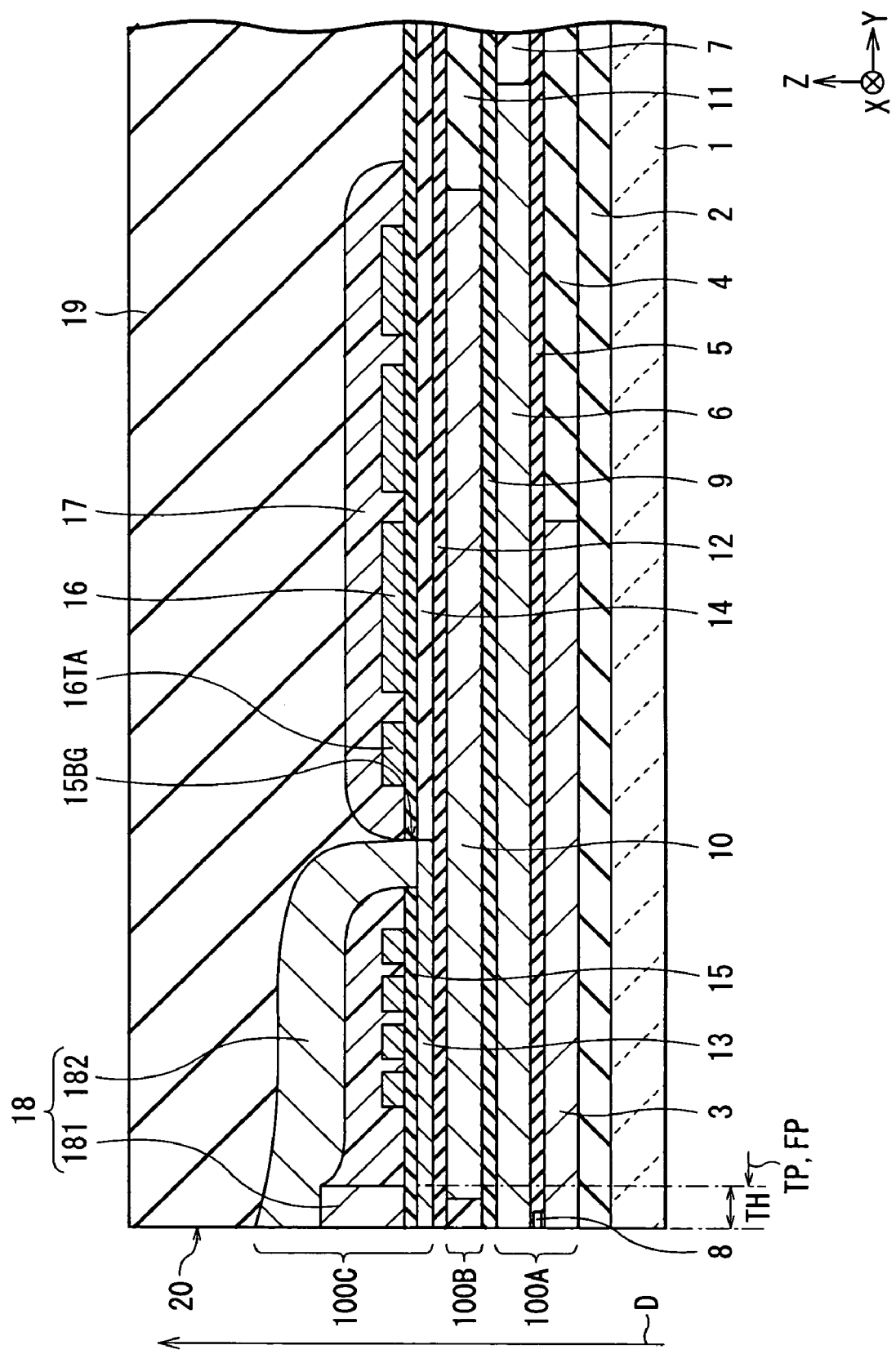
FIG. 16 is a cross-sectional view of assistance in explaining a fourth modified example of the configuration of the heat sink layer and its peripheral structure.

Fourthly, the heat sink layer 10 is not necessarily limited to the partitioned structure but may have a single continuous structure so as to extend continuously as shown in FIG. 16, although in the above-mentioned embodiment the heat sink layer 10 has the partitioned structure. The heat sink layer 10 having the single continuous structure can be formed with simplicity, as compared to the heat sink layer 10 having the partitioned structure.

Figure 17:
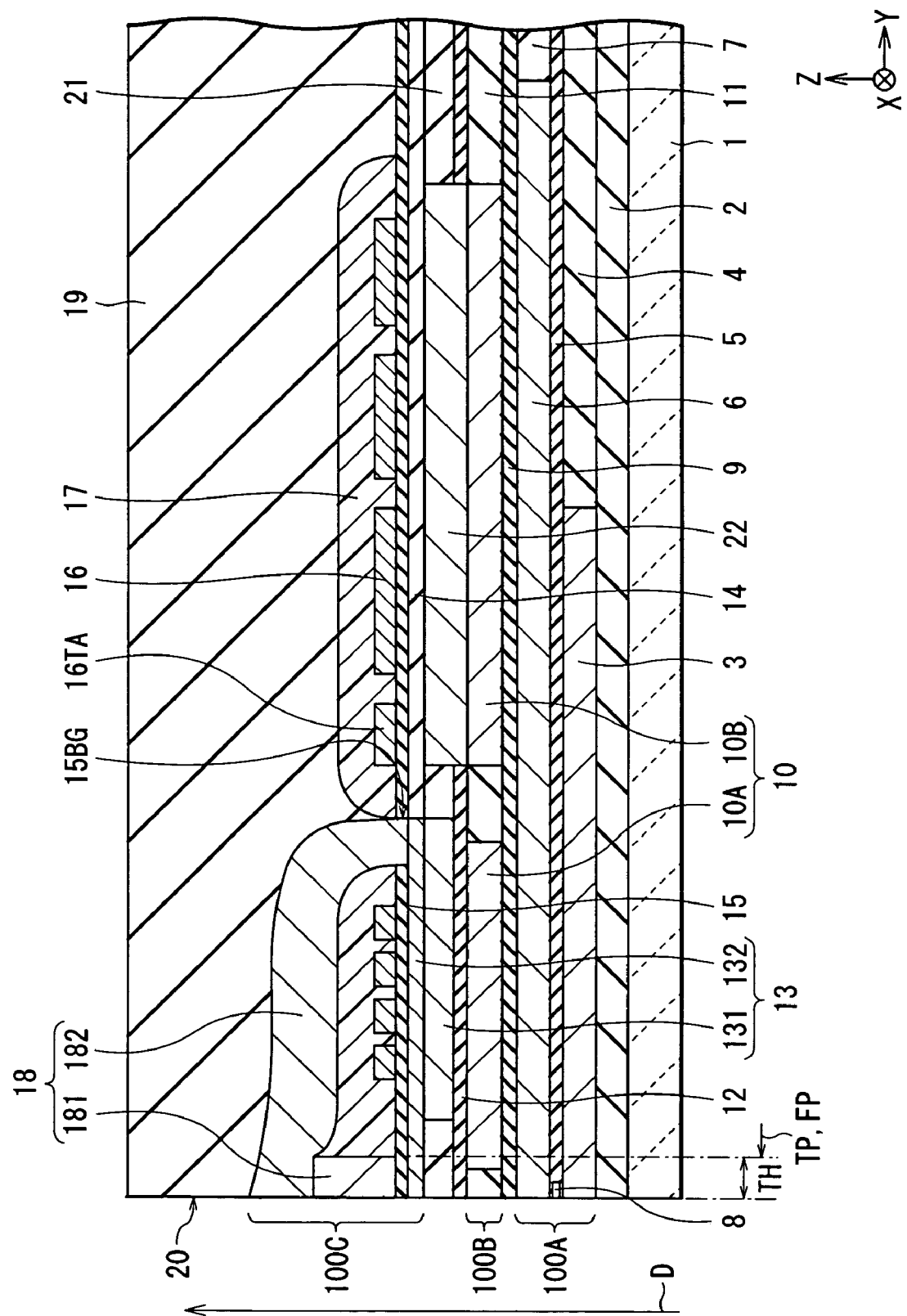
FIG. 17 is a cross-sectional view of assistance in explaining another modified example of the configuration of the thin film magnetic head according to the first embodiment of the invention.
Figure 18:
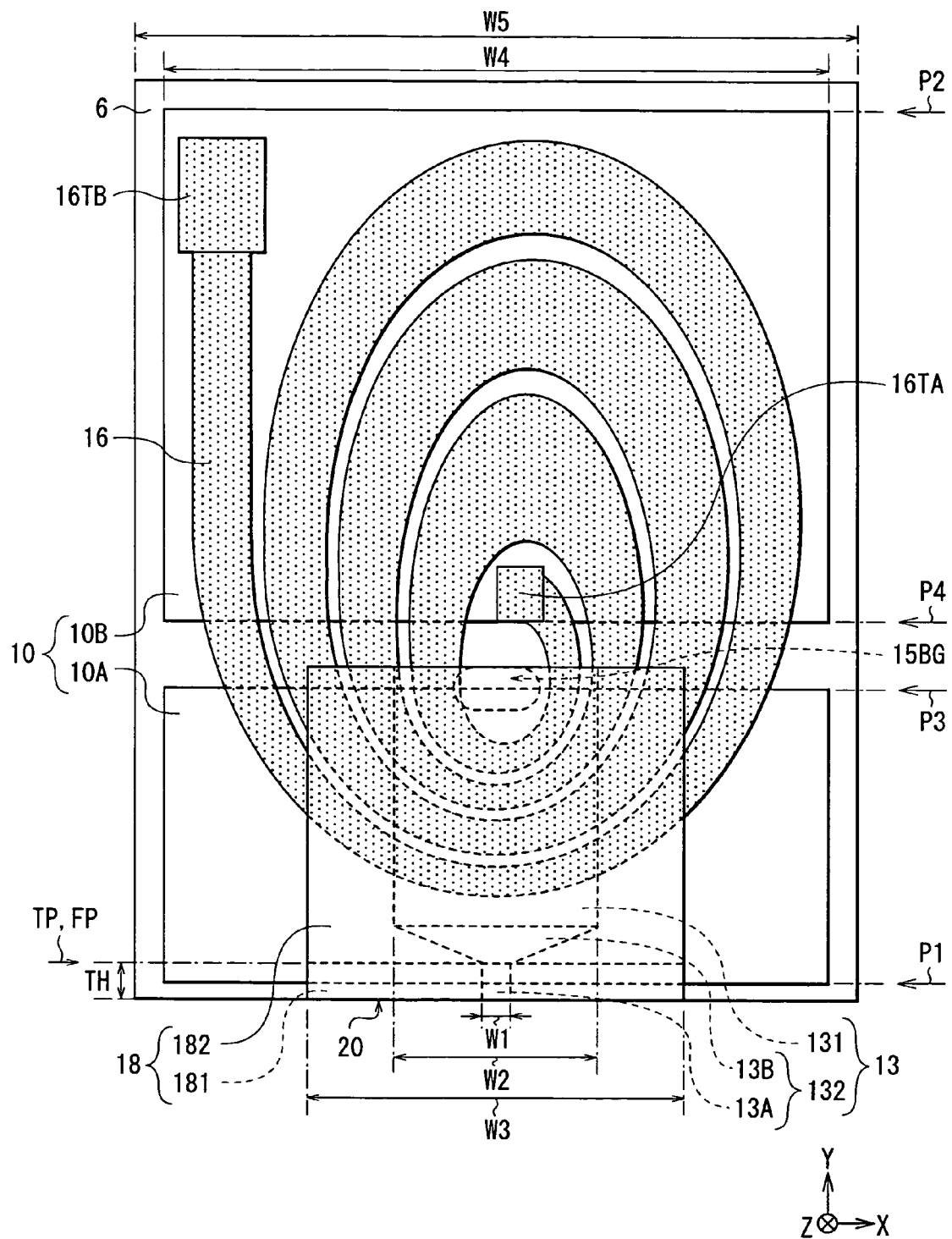
FIG. 18 is a plan view showing the plan configuration of a principal part of the thin film magnetic head shown in FIG. 17.

In the above-mentioned embodiment, the magnetic pole layer 13 has a single-layer structure. However, the magnetic pole layer 13 is not necessarily limited to this structure. For example, the magnetic pole layer 13 may have a stacked structure comprising an auxiliary magnetic pole layer 131 (or a first magnetic pole layer portion) and a main magnetic pole layer 132 (or a second magnetic pole layer portion), as shown in FIG. 17 corresponding to FIG. 1. The auxiliary magnetic pole layer 131 is disposed on the leading side so that an insulating layer 21 fills in around the auxiliary magnetic pole layer 131 extends rearward from a rearward position relative to the air bearing surface 20. The main magnetic pole layer 132 is disposed on the trailing side and extends rearward from the air bearing surface 20. The main magnetic pole layer 132 functions as a main magnetic flux emitting portion. For example, the main magnetic pole layer 132 has the same plan configuration as the magnetic pole layer 13 discussed in the description of the above-mentioned embodiment, as shown in FIG. 18 corresponding to FIG. 3. The auxiliary magnetic pole layer 131 functions as an auxiliary magnetic flux containing portion to ensure the magnetic volume of the main magnetic pole layer 132 (i.e., the volume of magnetic flux contained therein). For example, the auxiliary magnetic pole layer 131 has a rectangular shape having the width W2 in plan configuration, as shown in FIG. 18. The insulating layer 21 is made of, for example, the same material as the insulating layer 14. In the insulating layer, a supplementary heat sink layer is buried in a region corresponding to the rearward portion 10B of the heat sink layer 10. The supplementary heat sink layer is coupled to the rearward portion 10B in an opening formed in the isolating layer 12, and serves the heat dissipation function in the same manner as the rearward portion 10B. The thin film magnetic head configured as mentioned above can ensure the magnetic volume as well as reduce the size of an outlet for magnetic flux (i.e., an exposed surface of the main magnetic pole layer 132 exposed on the air bearing surface 20), by reason of the structural feature of the magnetic pole layer 13 having the stacked structure comprising the auxiliary magnetic pole layer 131 and the main magnetic pole layer 132. Therefore, this thin film magnetic head can increase the strength of recording magnetic field.

Second Embodiment

Next, the description is given with regard to a second embodiment of the invention.

Figure 19:
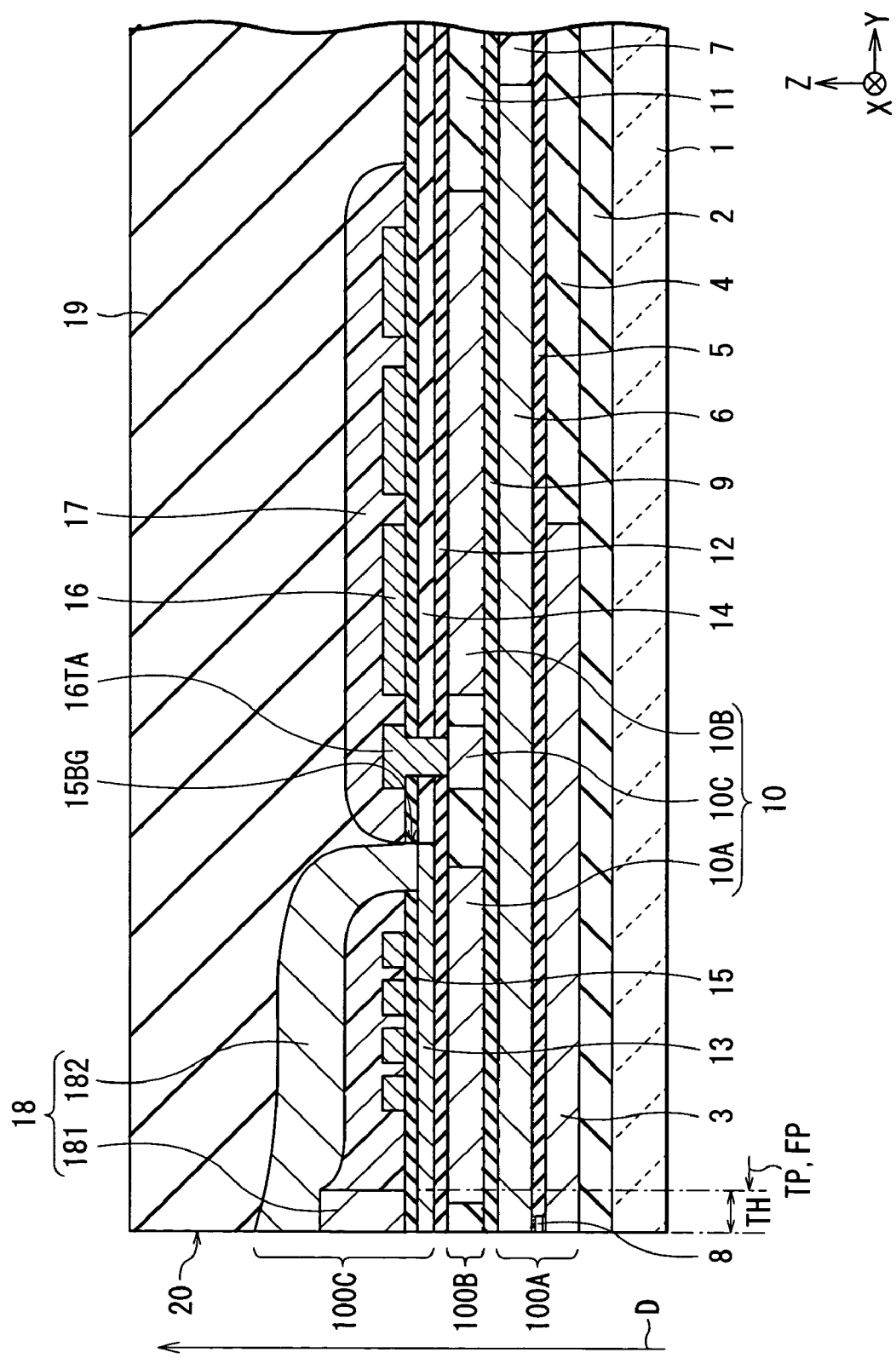
FIG. 19 is a cross-sectional view showing the cross-sectional configuration (i.e., the cross-sectional configuration perpendicular to the air bearing surface) of a thin film magnetic head according to a second embodiment of the invention.
Figure 20:
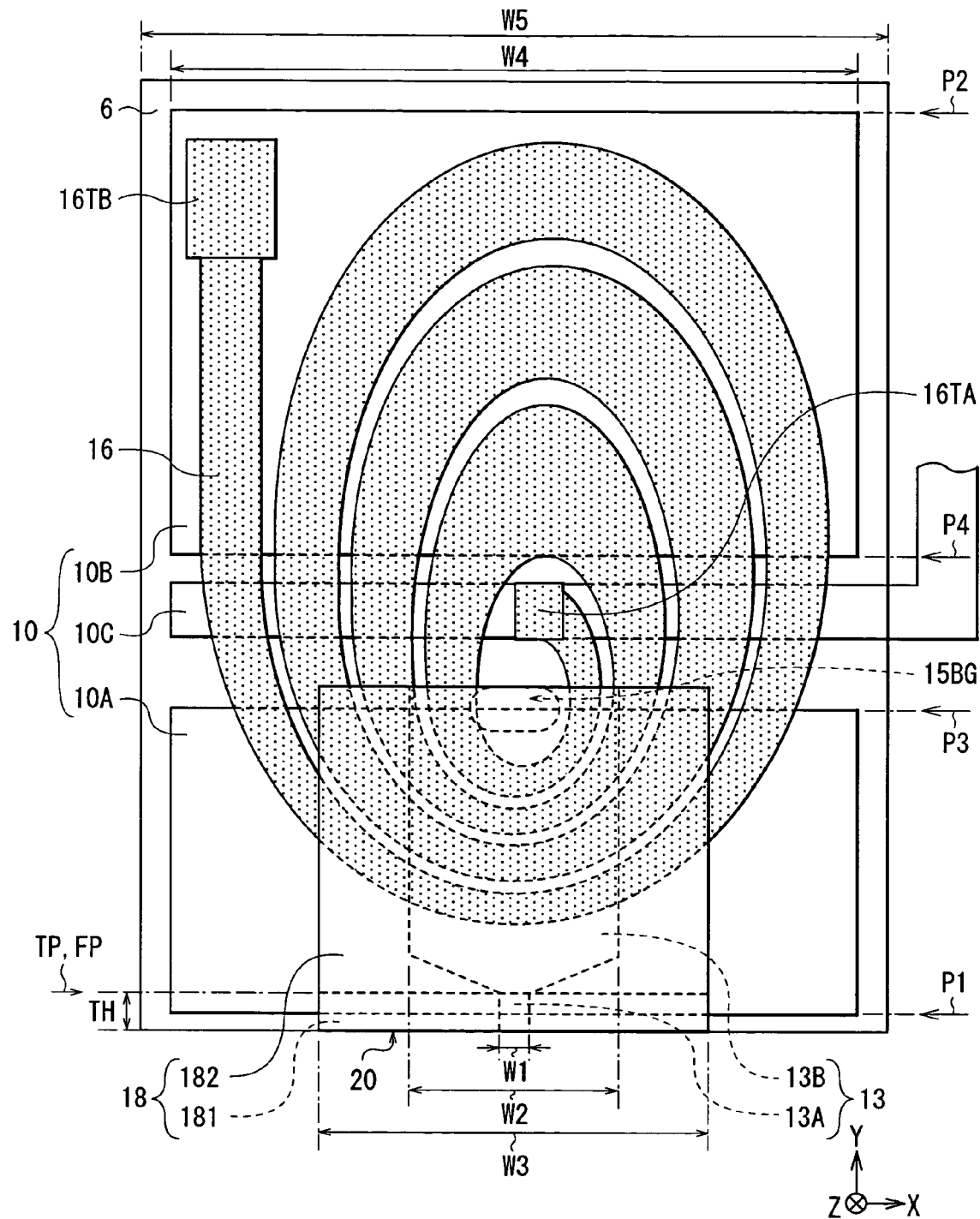
FIG. 20 is a plan view showing the plan configuration of a principal part of the thin film magnetic head shown in FIG. 19.

FIGS. 19 and 20 show the configuration of a thin film magnetic head according to the second embodiment of the invention. FIG. 19 shows the cross-sectional configuration corresponding to FIG. 1, and FIG. 20 shows the plan configuration corresponding to FIG. 3. In FIGS. 19 and 20, the same structural components as the components discussed in the description of the above-mentioned first embodiment are indicated by the same reference numerals.

The thin film magnetic head according to the second embodiment has the same configuration as the thin film magnetic head according to the above-mentioned first embodiment, except for the configuration of the heat sink layer 10. Specifically, the heat sink layer 10 of the second embodiment is partitioned into three portions (i.e., the frontward portion 10A, an intermediate portion 10C, and the rearward portion 10B) in the direction in which the heat sink layer 10 extends, as distinct from the heat sink layer 10 of the first embodiment which is partitioned into two portions (i.e., the frontward portion 10A and the rearward portion 10B) in the direction in which the heat sink layer 10 extends.

For example, as shown in FIGS. 19 and 20, the heat sink layer 10 constituting the heat sink part 100B of the thin film magnetic head of the second embodiment includes three separate structural components, that is, the frontward portion 10A, the rearward portion 10B, and the intermediate portion 10C (or a third heat sink layer portion). Specifically, the frontward portion 10A extends from the starting point P1 located rearward relative to the air bearing surface 20 to the midpoint P3. The rearward portion 10B extends from the midpoint P4 located rearward relative to the midpoint P3 to the endpoint P2. The intermediate portion 10C is disposed in a region between the frontward and rearward portions 110A and 10B at the position corresponding to the position of the terminal 16TA on one end of the thin film coil 16, and the intermediate portion 10C is isolated from the frontward and rearward portions 10A and 10B and is electrically connected to the terminal 16TA. For example, the intermediate portion 10C serves the heat dissipation function in the same manner as the frontward and rearward portions 10A and 10B, and also functions as a lead to feed a current to the thin film coil 16 through the terminal 16TA. The intermediate portion 10C is made of a material having electrical conductivity as well as having thermal conductivity and thermal expansibility in the same manner as the frontward and rearward portions 10A and 10B. For example, the intermediate portion 10C has an L shape in plan configuration in such a manner that its one end extends outward from the region between the frontward and rearward portions 10A and 10B. The distance between the intermediate and frontward portions 10C and 10A and the distance between the intermediate and rearward portions 10C and 10B can be freely set, provided only that electrical connection can be provided between the intermediate portion 10C and the terminal 16TA.

When a current is fed to the thin film coil 16 through the outward extending one end of the intermediate portion 10C of the heat sink layer 10, the thin film magnetic head of the second embodiment performs the operation for recording information in the same manner as the thin film magnetic head of the above-mentioned first embodiment. During the recording operation, heat produced by the thin film coil 16 is dissipated via the heat sink layer 10, that is, the frontward and rearward portions 10A and 10B and the intermediate portion 10C. The thin film magnetic head of the second embodiment can be manufactured by using the manufacturing method discussed in the description of the above-mentioned first embodiment, except that the step of forming the heat sink layer 10 of the second embodiment includes patterning the heat sink layer 10 including the intermediate portion 10C as well as the frontward and rearward portions 10A and 10B.

The thin film magnetic head according to the second embodiment includes the heat sink layer 10 including the intermediate portion 10C as well as the frontward and rearward portions 10A and 10B, and the intermediate portion 10C is connected to the terminal 16TA on one end of the thin film coil 16 so as to also function as the lead to feed a current to the thin film coil 16. Thus, the thin film magnetic head of the second embodiment enables feeding a current to the thin film coil 16 by utilizing the intermediate portion 10C, while dissipating heat produced by the thin film coil 16 by utilizing the intermediate portion 10C in the same manner as the frontward and rearward portions 10A and 10B. Thus, the thin film magnetic head of the second embodiment allows simple formation of the lead for feeding a current to the thin film coil 16 and thus facilitates manufacturing the thin film magnetic head, as distinct from the thin film magnetic head of the above-mentioned first embodiment including the heat sink layer 10 not including the intermediate portion 10C which also functions as the lead. The reason is as follows. The method of manufacturing the thin film magnetic head of the above-mentioned first embodiment including the heat sink layer 10 not including the intermediate portion 10C requires three steps in order to enable the supply of a current to the thin film coil 16: the step of forming the heat sink layer 10; the step of forming the thin film coil 16; and the step of forming the lead to be connected to the terminal 16TA independently of the thin film coil 16. On the other hand, the method of manufacturing the thin film magnetic head of the second embodiment including the heat sink layer 10 including the intermediate portion 10C requires only two steps in order to enable the supply of a current to the thin film coil 16: the step of forming the heat sink layer 10 including the intermediate portion 10C; and the step of forming the lead on one end of the intermediate portion 10C as well as forming the thin film coil 16. In this method, the step of forming the heat sink layer 10 includes forming the intermediate portion 10C which functions as part of the lead, and the intermediate portion 10C is formed so that the intermediate portion 10C is connected to the terminal 16TA and that its one end extends outward from the region between the frontward and rearward portions 10A and 110B. Thus, a smaller number of steps required to form the lead for the current supply yields a simple process for manufacturing the thin film magnetic head.

The configurations, operations, functions, advantages and modified examples of the thin film magnetic head according to the second embodiment, except for those described above, are the same as those of the thin film magnetic head according to the above-mentioned first embodiment, and the functions and advantages of the method of manufacturing the thin film magnetic head according to the second embodiment, except for those described above, are the same as those of the method of manufacturing the thin film magnetic head according to the above-mentioned first embodiment. Thus, the description of them is omitted.

The above description is all the description of the thin film magnetic heads according to the embodiments of the invention.

Figure 21:
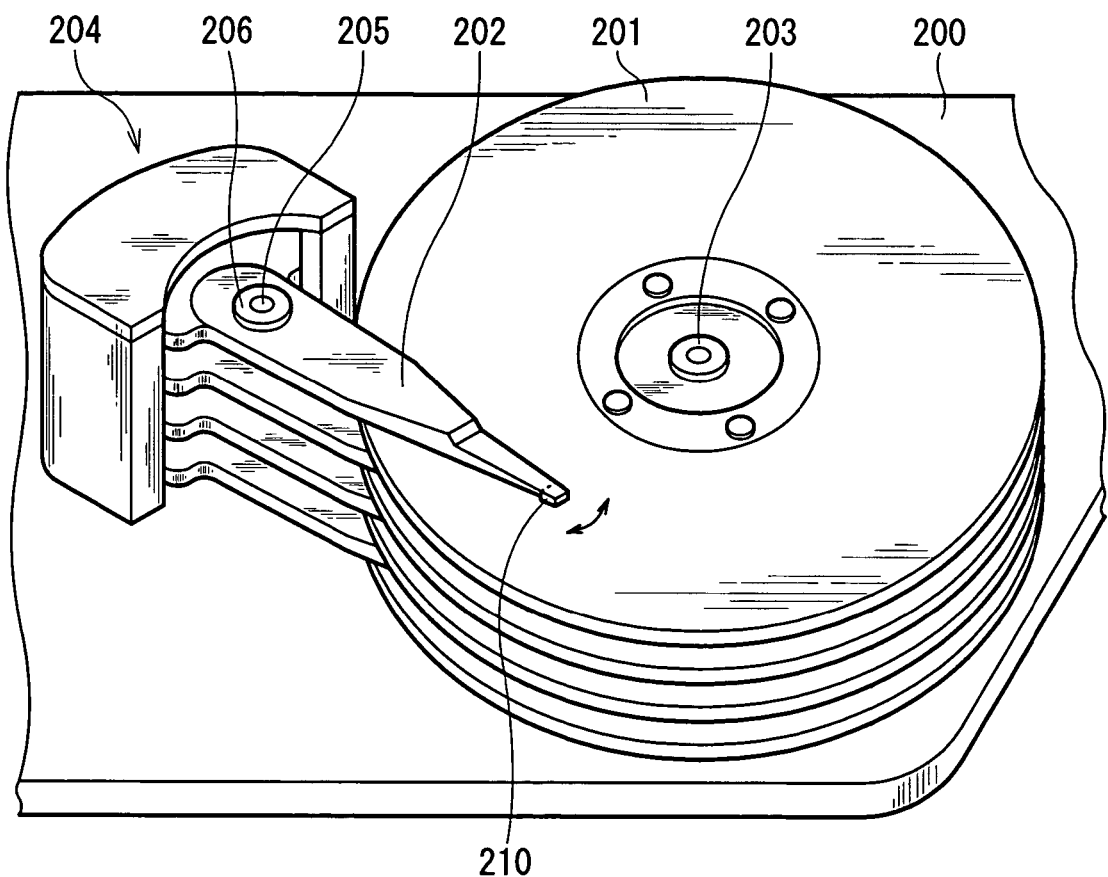
FIG. 21 is a cutaway view in perspective of the external configuration of a magnetic recording apparatus equipped with the thin film magnetic head of the invention.
Figure 22:
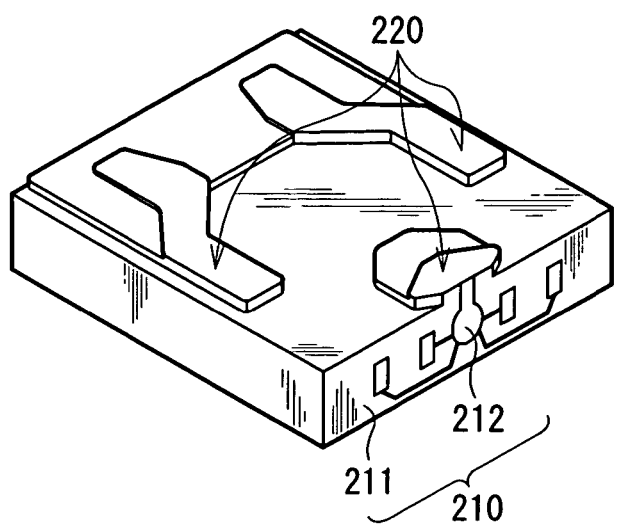
FIG. 22 is an enlarged perspective view of the external configuration of a principal part of the magnetic recording apparatus shown in FIG. 21.

Next, the description is given with reference to FIGS. 21 and 22 with regard to the configuration of the magnetic recording apparatus equipped with the thin film magnetic head of the invention. FIG. 21 illustrates, in cutaway view, the external configuration of the magnetic recording apparatus, and FIG. 22 illustrates, in enlarged view, the external configuration of a principal part of the magnetic recording apparatus. The magnetic recording apparatus is equipped with the thin film magnetic head of the above-described first or second embodiment, and the apparatus is, for example, a hard disk drive.

For example, as shown in FIG. 21, the magnetic recording apparatus includes a plurality of magnetic disks (or hard disks) 201, each of which acts as a recording medium on which information is to be recorded, and a plurality of arms 202, each of which is disposed corresponding to each magnetic disk 201 and has a head slider 210 mounted on its end, and the magnetic disks 201 and the arms 202 are contained within a housing 200. The magnetic disks 201 are rotatable about a spindle motor 203 fixed to the housing 200. The arms 202 are connected to a drive 204 which acts as a power source, and the arms 202 are pivotable on a bearing 206 about a fixed pivot 205 fixed to the housing 200. The drive 204 includes a driving source such as a voice coil motor. In FIG. 21, there is shown, for example, a model which permits a plurality of arms 202 to integrally pivot about the fixed pivot 205.

As shown in FIG. 22, the head slider 210 comprises a base 211 in substantially the shape of a rectangular parallelepiped, having asperities which are formed on its one surface (i.e., an air bearing surface 220) in order to reduce air resistance during the pivoting of the arms 202, and a thin film magnetic head 212 of perpendicular recording type which is mounted on one side surface of the base 211, specifically the side surface thereof perpendicular to the air bearing surface 220 (more specifically a front right surface in FIG. 22). For example, the thin film magnetic head 212 has the configuration of the thin film magnetic head of the above-described first or second embodiment. In FIG. 22, the head slider 210 is shown in an inverted position from that shown in FIG. 21 so that the structure of the air bearing surface 220 can be easily seen.

The description of the detailed configuration of the thin film magnetic head 212 is omitted because the detailed description thereof has been previously given by referring to the above-mentioned embodiments.

When recording information, the magnetic recording apparatus operates in the following manner. When the arms 202 pivot, the head slider 210 moves to a predetermined region (i.e., a recording region) of the magnetic disk 201. When a current is fed through the thin film magnetic head 212 as faced with the magnetic disk 201, the thin film magnetic head 212 then operates as discussed in the above description of the first or second embodiment. Thus, the thin film magnetic head 212 records information on the magnetic disk 201.

The magnetic recording apparatus includes the thin film magnetic head 212 of the invention. Thus, the magnetic recording apparatus can prevent the occurrence of a breakdown resulting from a collision of the thin film magnetic head 212 with the magnetic disk 201, insofar as possible.

The configurations, operations, functions, advantages and modified examples of the thin film magnetic head 212 mounted on the magnetic recording apparatus, except for those described above, are the same as those of the thin film magnetic head of the above-mentioned first or second embodiment. Thus, the description of them is omitted.

EXAMPLES

Next, the description is given with regard to an example of the invention.

Figure 23:
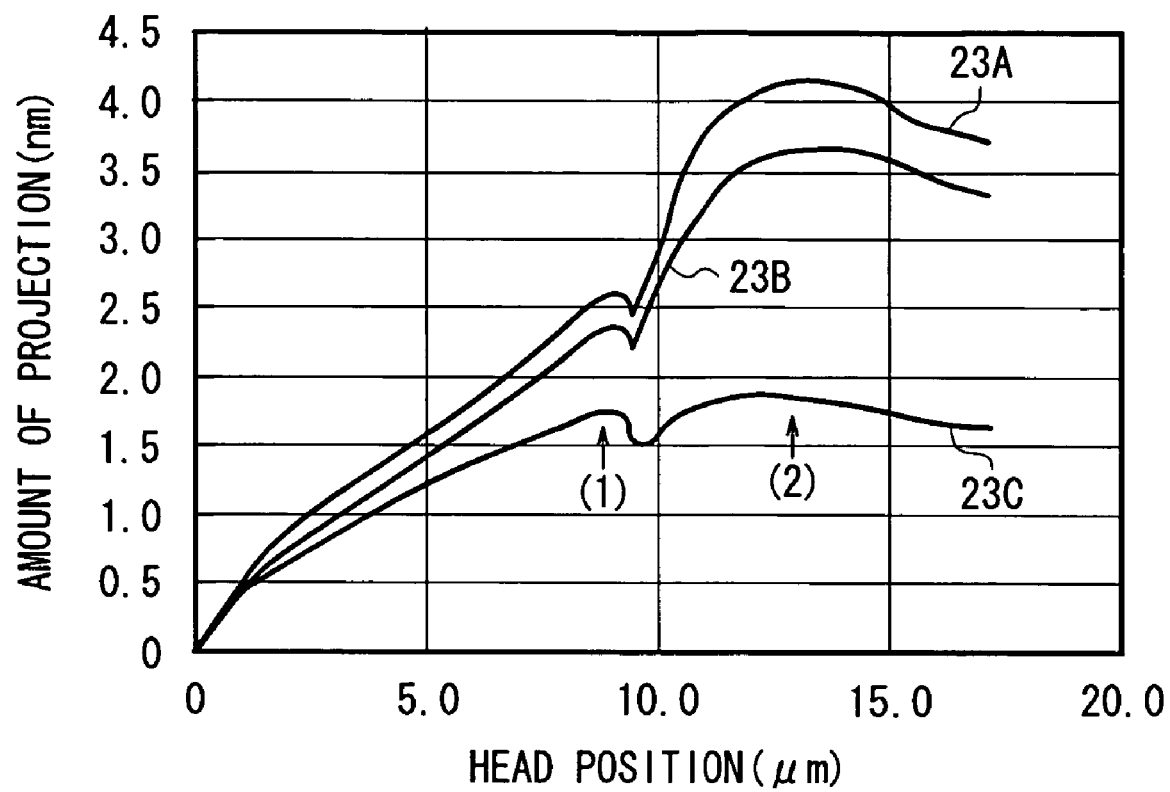
FIG. 23 is a plot showing the correlation between the head position and the amount of protrusion of the thin film magnetic head of the invention.

Recording was performed using the magnetic recording apparatus (see FIGS. 21 and 22) equipped with the thin film magnetic head of the above-described first embodiment (see FIGS. 1 to 3) (hereinafter referred to simply as "the thin film magnetic head of the invention"), which was used as a typical representative of the thin film magnetic heads of the invention having the configurations discussed in the description of the above-mentioned embodiments. During the recording, the measurement was made of the amount of protrusion of the thin film magnetic head of the invention. The results of measurement are shown in FIG. 23. FIG. 23 shows the correlation between the head position and the amount of protrusion. In FIG. 23, the "horizontal axis" indicates the head position. As employed herein, the head position refers to the position (μm) relative to a reference position (0 μm) as viewed along the thickness (i.e., along the Z axis) in the thin film magnetic head, and the reference position refers to the position of the substrate 1 (i.e., the position of the boundary between the substrate 1 and the insulating layer 2). In FIG. 23, the "vertical axis" indicates the amount of protrusion, specifically the length (nm) of protrusion of each of the thin film magnetic head's structural components beyond the air bearing surface 20. When the measurement was made of the amount of protrusion of the thin film magnetic head of the invention, the measurement was also made of the amount of protrusion of each of the thin film magnetic heads of the first and second comparative examples shown in FIGS. 9 and 10, respectively, in the above-mentioned first embodiment, for the purpose of side-by-side comparison and evaluation of the amount of protrusion. In FIG. 23, the reference characters "23A", "23B", and "23C" denote the results of measurements made on the thin film magnetic heads of the first comparative example, the second comparative example, and the invention, respectively. In FIG. 23, the reference characters "(1)" and "(2)" indicate the position of the magnetic pole layer 13 and the position of the write shield layer 18, respectively. The conditions for the configuration of the thin film magnetic head of the invention were set in the following manner: the material of the heat sink layer 10 was copper; the thickness and width of the heat sink layer 10 were equal to 3.1 μm and 90 μm, respectively; a magnetomotive force applied to the thin film coil 16 was equal to 150 AT; and the thicknesses of the isolating layers 9 and 12 were each equal to 0.2 μm.

As can be seen from the results of measurements shown in FIG. 23, the amount of protrusion of the thin film magnetic head was progressively larger farther away from the substrate 1 and was remarkably large particularly at the respective positions (1) and (2) of the magnetic pole layer 13 and the write shield layer 18. A comparison was made of the amount of protrusion of the magnetic pole layer 13 of the first comparative example (23A), the amount of protrusion of the magnetic pole layer 13 of the second comparative example (23B), and the amount of protrusion of the magnetic pole layer 13 of the invention (23C). A comparison was also made of the amount of protrusion of the write shield layer 18 of the first comparative example (23A), the amount of protrusion of the write shield layer 18 of the second comparative example (23B), and the amount of protrusion of the write shield layer 18 of the invention (23C). The results of comparison are as follows. As for both the amount of protrusion of the magnetic pole layer 13 and the amount of protrusion of the write shield layer 18, the amount of protrusion of the second comparative example was smaller than the amount of protrusion of the first comparative example, and furthermore the amount of protrusion of the invention was smaller than the amount of protrusion of the second comparative example. Specifically, the T1 and T2 values of the first comparative example were equal to 2.60 (nm) and 4.10 (nm), respectively (T1=2.60 (nm), T2=4.10 (nm)), where T1 and T2 denote the amount of protrusion of the magnetic pole layer 13 and the amount of protrusion of the write shield layer 18, respectively. The T1 and T2 values of the second comparative example were equal to 2.30 (nm) and 3.70 (nm), respectively (T1=2.30 (nm), T2=3.70 (nm)). The T1 and T2 values of the invention were equal to 1.74 (nm) and 1.90 (nm), respectively (T1=1.74 (nm),T2=1.90 (nm)), and were remarkably low. As is apparent from these results, the increasing order of the degree of improvement in the heat dissipation characteristics of the thin film magnetic head is the first comparative example, the second comparative example, and the invention. In other words, the decreasing order of the amount of heat accumulating in the recording head part 100C in the thin film magnetic head is the first comparative example, the second comparative example, and the invention. It has been thus shown that the thin film magnetic head of the invention can reduce the amount of protrusion of the magnetic pole layer 13 and the amount of protrusion of the write shield layer 18, thus prevent the layers 13 and 18 from colliding with the recording medium, and thus ensure the recording operation with stability, as compared to the thin film magnetic heads of the first and second comparative examples.

Although the invention has been described above by referring to some embodiments, the invention is not limited to these embodiments and various modifications of the invention are possible. Specific examples are as follows. Although the invention has been described as applied to the head of the single magnetic pole type by referring to the above-mentioned embodiments, the invention is not necessarily limited to this type of head but may be applied to a ring-type head. Although the invention has been described as applied to the combined thin film magnetic head by referring to the above-mentioned embodiments, the invention is not necessarily limited to this head but may be applied to, for example, a record-only thin film magnetic head having an inductive magnetic transducer for use in writing, or a thin film magnetic head having an inductive magnetic transducer for use in both recording and reproducing. The invention may be, of course, applied to a thin film magnetic head having a structure including a writing element and a reading element which are stacked in reverse order.

Although the invention has been described as applied to the thin film magnetic head of the perpendicular recording type by referring to the above-mentioned embodiments, the invention is not necessarily limited to this type of head but may be applied to a thin film magnetic head of longitudinal recording type.

The thin film magnetic head of the invention and the magnetic recording apparatus including the thin film magnetic head of the invention can be applied to, for example, a hard disk drive which magnetically records information on a hard disk.

Obviously many modifications and variations of the present invention are possible in the light of the above teachings. It is therefore to be understood that within the scope of the appended claims the invention may be practiced otherwise than as specifically described.

What is claimed is:

1. A thin film magnetic head comprising:
    a reproducing head part including a magnetoresistive effect element;
    a recording head part including:
        a thin film coil which generates a magnetic flux;
        a magnetic pole layer extending rearward from a recording-medium-facing surface to be faced with a recording medium; and emitting the magnetic flux generated by the thin film coil to the recording medium; and
        a write shield layer extending rearward from the recording-medium-facing surface, being separated from the magnetic pole layer by a gap layer at the recording-medium-facing surface, and being connected to the magnetic pole layer rearward from the recording-medium-facing surface; and
    a heat sink layer being located between the reproducing head part and the recording head part and dissipating heat produced by the thin film coil, wherein
    the magnetic pole layer is located on the side closer to the heat sink layer than the write shield layer, and
    the heat sink layer extends from a starting point located rearward relative to the recording-medium-facing surface to a rearward endpoint, and has a partitioned structure in which the heat sink layer is partitioned into a plurality of portions in a direction in which the heat sink layer extends.

2. A thin film magnetic head according to claim 1, wherein the heat sink layer is made of a nonmagnetic material.

3. A thin film magnetic head according to claim 1, wherein the heat sink layer is made of a material having higher thermal conductivity and a lower coefficient of thermal expansion than the write shield layer.

4. A thin film magnetic head according to claim 1, wherein the heat sink layer is made of a material having higher thermal conductivity and a lower coefficient of thermal expansion than the magnetic pole layer.

5. A thin film magnetic head according to claim 1, wherein the heat sink layer contains a material selected from a group consisting of copper (Cu), gold (Au), silver (Ag), platinum (Pt), palladium (Pd), chromium (Cr), zinc (Zn), tin (Sn), and tungsten (W).

6. A thin film magnetic head according to claim 1 further including a first isolating layer disposed between the heat sink layer and the magnetic pole layer,
    wherein the heat sink layer is electrically isolated from the magnetic pole layer with the first isolating layer in between.

7. A thin film magnetic head according to claim 1 further comprising:
    a read shield layer which magnetically isolates the magnetoresistive effect element from the recording head part, the read shield layer being disposed between the magnetoresistive effect element and the heat sink layer, wherein
        the magnetoresistive effect element performs magnetic processing utilizing a magnetoresistive effect.

8. A thin film magnetic head according to claim 7, wherein
    the read shield layer is disposed in a region corresponding to a region in which the heat sink layer is disposed, and
    the contour of the plan configuration of the read shield layer is larger than the contour of the plan configuration of the heat sink layer.

9. A thin film magnetic head according to claim 7 further comprising a second isolating layer disposed between the heat sink layer and the read shield layer,
    wherein the heat sink layer is electrically isolated from the read shield layer with the second isolating layer in between.

10. A thin film magnetic head according to claim 1 further comprising a third isolating layer which fills in around the heat sink layer, wherein
    the heat sink layer is electrically isolated from its surroundings with the third isolating layer in between.

11. A thin film magnetic head according to claim 1, wherein
    the heat sink layer is disposed in a region corresponding to a region in which the thin film coil is disposed, and the contour of the plan configuration of the heat sink layer is larger than the contour of the plan configuration of the thin film coil.

12. A thin film magnetic head according to claim 1, wherein the heat sink layer includes at least one of first and second heat sink layer portions, the first heat sink layer portion extends from the starting point to a first midpoint between the starting point and the endpoint, and the second heat sink layer portion extends from a second midpoint located rearward relative to the first midpoint to the endpoint and is isolated from the first heat sink layer portion.

13. A thin film magnetic head according to claim 1, wherein the heat sink layer is made of a plated film.

14. A thin film magnetic head according to claim 1, wherein the magnetic pole layer is configured to emit a magnetic flux for magnetizing the recording medium in a direction perpendicular to the surface of the recording medium.

15. A magnetic recording apparatus including a thin film magnetic head, the thin film magnetic head comprising:

a reproducing head part including a magnetoresistive effect element;

a recording head part including:

a thin film coil which generates a magnetic flux;

a magnetic pole layer extending rearward from a recording-medium-facing surface to be faced with a recording medium; and emitting the magnetic flux generated by the thin film coil to the recording medium; and a write shield layer extending rearward from the recording-medium-facing surface, being separated from the magnetic pole layer by a gap layer at the recording-medium-facing surface, and being connected to the magnetic pole layer rearward from the recording-medium-facing surface; and a heat sink layer being located between the reproducing head part and the recording head part and dissipating heat produced by the thin film coil, wherein the magnetic pole layer is located on the side closer to the heat sink layer than the write shield layer, and the heat sink layer extends from a starting point located rearward relative to the recording-medium-facing surface to a rearward endpoint, and has a partitioned structure in which the heat sink layer is partitioned into a plurality of portions in a direction in which the heat sink layer extends.

* * * * *